US012416191B2

(12) United States Patent
Beck et al.

(10) Patent No.: US 12,416,191 B2
(45) Date of Patent: Sep. 16, 2025

(54) AUTOMATIC DOOR ASSEMBLY HAVING A SENSOR DEVICE, AND METHOD FOR OPERATING AN AUTOMATIC DOOR ASSEMBLY OF THIS KIND

(71) Applicant: Assa Abloy Entrance Systems AB, Landskrona (SE)

(72) Inventors: Alexander Beck, Zurich (CH); Marco Hauri, Galgenen (CH)

(73) Assignee: Assa Abloy Entrance Systems AB, Landskrona (SE)

( * ) Notice: Subject to any disclaimer, the term of this patent is extended or adjusted under 35 U.S.C. 154(b) by 0 days.

(21) Appl. No.: 18/565,807

(22) PCT Filed: May 27, 2022

(86) PCT No.: PCT/EP2022/064459

§ 371 (c)(1),
(2) Date: Nov. 30, 2023

(87) PCT Pub. No.: WO2022/263147

PCT Pub. Date: Dec. 22, 2022

(65) Prior Publication Data

US 2024/0263505 A1 Aug. 8, 2024

(30) Foreign Application Priority Data

Jun. 14, 2021 (DE) ......................... 102021115280.1

(51) Int. Cl.
*E05F 15/43* (2015.01)

(52) U.S. Cl.
CPC ........ *E05F 15/43* (2015.01); *E05F 2015/434* (2015.01); *E05Y 2800/21* (2013.01); *E05Y 2900/132* (2013.01)

(58) Field of Classification Search
CPC ....................................................... E05F 15/43
See application file for complete search history.

(56) References Cited

U.S. PATENT DOCUMENTS

| | | | |
|---|---|---|---|
| 5,001,557 | A | 3/1991 | Begle |
| 10,487,565 | B2 | 11/2019 | Agam |

(Continued)

FOREIGN PATENT DOCUMENTS

| | | |
|---|---|---|
| DE | 102006008513 | 9/2007 |
| DE | 102014205282 | 9/2015 |

(Continued)

OTHER PUBLICATIONS

International Search Report and Written Opinion for PCT/EP2022/064459, completed Sep. 6, 2022.

*Primary Examiner* — Tony Ko
(74) *Attorney, Agent, or Firm* — Wissing Miller LLP

(57) ABSTRACT

An automatic door system (1) comprises at least one door leaf (2*a*, 2*b*, 2*c*, 2*d*) which can be moved by a drive apparatus (6). A control device (7) is designed to control the drive apparatus (6) in such a way that the latter moves the at least one door leaf (2*a*, 2*b*, 2*c*, 2*d*). A sensor device (8) comprises a first area scan camera (9*a*) which comprises an image sensor, the first area scan camera (9*a*) being designed to generate first image data from a detection area (11) within which the automatic door system (1) can be monitored. The control device (7) is designed to determine whether the at least one door leaf (2*a*, 2*b*, 2*c*, 2*d*) can be moved safely by means of a detailed analysis based on at least a portion of the first image data from the first area scan camera (9*a*) and at least one additional piece of information (12). The sensor device (8) comprises an information-generating device (13) which is separate from the first area scan camera (9*a*) and contributes to the generation of the at least one piece of additional information (12).

22 Claims, 18 Drawing Sheets

(56) References Cited

U.S. PATENT DOCUMENTS

| | | | | |
|---|---|---|---|---|
| 2002/0125435 | A1 | 9/2002 | Cofer | |
| 2012/0154583 | A1 | 6/2012 | Lundberg | |
| 2019/0218847 | A1 | 7/2019 | Agam | |
| 2021/0189788 | A1* | 6/2021 | Dreyer .................... | E05F 15/40 |

FOREIGN PATENT DOCUMENTS

| | | |
|---|---|---|
| DE | 102019112338 | 11/2020 |
| FR | 2800895 | 5/2001 |
| WO | 2018178054 | 10/2018 |
| WO | 2000047511 | 8/2020 |

* cited by examiner

AUTOMATIC DOOR ASSEMBLY HAVING A SENSOR DEVICE, AND METHOD FOR OPERATING AN AUTOMATIC DOOR ASSEMBLY OF THIS KIND

This application is a 371 of PCT/EP2022/064459, filed on May 27, 2022, published on Dec. 22, 2022, under publication number WO 2022/263147, which claims priority benefits from German Patent Application No. 10 2021 115 280.1, filed on Jun. 14, 2021, the disclosure of each of which are incorporated herein by reference.

The invention relates to an automatic door assembly with a sensor device and to a method for operating such an automatic door assembly. Such an automatic door assembly is used particularly in buildings in order to allow or restrict access to the building or within the building or to prevent the building from cooling down or heating up excessively. In principle, however, the automatic door assembly could also be used in means of transport such as trains or ships, for example. The automatic door assembly comprises various types of automatic doors, such as sliding doors, folding doors, swing doors, or revolving doors.

What all of these doors have in common is that the respective door leaf is motor-driven. It must be ensured that there are no objects or people in the range of motion of the respective door leaf, particularly in order to prevent people from getting injured. For this reason, sensors are used to detect the presence of objects and people within the range of motion of the door leaves.

The U.S. Pat. No. 10,487,565 B2 describes an automatic door assembly in the form of a sliding door in which a TOF camera is arranged on each side of the sliding door in order to monitor an area in front of the sliding door. These TOF cameras can be used to create a three-dimensional image in order to detect objects and people.

The drawback of U.S. Pat. No. 10,487,565 B2 is that the solution is computationally intensive and therefore expensive. Not only are TOF cameras commensurately expensive to purchase, but the energy requirement is also an important criterion for the economical operation of a door assembly.

It is therefore the object of the present invention to provide an automatic door assembly that can be operated economically.

The object is achieved by the automatic door assembly disclosed and claimed. Advantageous refinements of the automatic door assembly are specified including a building with such an automatic door system and a method for operating such an automatic door system.

The automatic door system according to the invention comprises a sensor device and is used particularly in buildings. The door system also comprises at least one door leaf and one drive apparatus (e.g., electric motor) for moving the at least one door leaf. In addition to the at least one motor, the drive apparatus can also comprise at least one transmission. A control device (e.g., microcontroller, FPGA) is also provided and designed to control the drive apparatus in such a way that it moves the door leaf. The sensor device comprises a first area scan camera which has an image sensor, the first area scan camera being designed to generate first image data from a detection area within which the automatic door system can be monitored. The first area scan camera can also be referred to as a MONO camera. The first area scan camera comprises an image sensor and is only designed to record a 2D image and is therefore not a stereo camera, TOF camera, or 3D camera. The first area scan camera preferably comprises exactly one optical axis. The detection area preferably corresponds to the entire image that the first area scan camera is able to capture. In principle, the detection area could also represent only a portion of the image that can be captured by the first area scan camera. For example, it would be conceivable for the first area scan camera to partially capture a support structure of the door assembly due to its mounting position, so that these pixels of the first area scan camera do not count as part of the detection area. The control device is designed to determine whether the door leaf can be moved safely (i.e., in a collision-free manner) by means of a detailed analysis based on at least a portion of the first image data from the first area scan camera and at least one additional piece of information. For this purpose, the sensor device comprises an information-generating device which is separate from the first area scan camera and contributes to the generation of the at least one piece of additional information. It is especially advantageous that a simple and inexpensive area scan camera is used and that only a portion of the first image data from the first area scan camera is reconciled with additional information in order to achieve greater accuracy. This makes it possible for an inexpensive camera to be used in the form of an area scan camera, with a separate information-generating device being used in order to enhance the accuracy of portions of the capture range of the area scan camera (if necessary).

In another preferred embodiment, the control device is designed to detect the presence of an object (object, person) in the detailed analysis in an area to be secured which represents a portion of the detection area of the first area scan camera with a greater level of accuracy based on the at least one additional piece of information than would be possible with just the first image data from the first area scan camera. The additional computing power required is only used for more precise analysis of the protection area. The remaining portion of the detection area of the first area scan camera that is not part of the area to be secured is examined for the presence of an object with a lower level of accuracy.

In another preferred embodiment, the control device is designed to carry out a rough analysis in which only the first image data from the first area scan camera are analyzed in order to determine whether there is an object in the detection area. The term “only” means that the at least one additional piece of information is not used for the analysis in this case. In this embodiment, the entire detection area of the first area scan camera, or only the portion of the detection area that is not part of the area to be secured, can be examined for the presence of an object without using the at least one additional piece of information. Preferably, the information-generating device can be put into standby mode or switched off completely (by the control device, for example) if only a rough analysis is being carried out. This also saves energy.

In another preferred embodiment, the control device is designed to carry out a rough analysis of the first image data from the first area scan camera at regular time intervals.

Such a rough analysis is preferably carried out for each captured image. As a matter of principle, it is possible for a rough analysis, which preferably involves capturing the first image data, to be carried out at regular intervals. For example, a rough analysis can be carried out every 50 ms, 100 ms, 200 ms, 400 ms, 600 ms, 800 ms, 1000 ms, 1200 ms, 1400 ms, 1600 ms, 1800 ms, or 2000 ms. In particular, a rough analysis is carried out when the door leaf is to be moved. If the door leaf is to remain in its position (in the open position, for example), it is not absolutely necessary for a rough analysis to be carried out. Furthermore, the control device is designed to carry out the detailed analysis in the event that the rough analysis of the first image data from the first area scan camera indicates that an object is located in the area to be secured with a probability that is greater than a first threshold value. If there is a very high probability (e.g., >90%) that there is no object in the area to be secured, the detailed analysis does not need to be carried out. If, on the other hand, there is a very high probability (for example>90%) that an object is located in the hedging area, the detailed analysis does not necessarily have to be carried out. Instead, the detailed analysis must be carried out if the result of the rough analysis is not clear—i.e., if the rough analysis indicates that an object is in the area to be secured with a probability that is greater than a first threshold value but preferably less than a second threshold value. The first threshold can be 10%, 20%, or 30%, for example. The second threshold can be 70%, 80%, or 90%, for example. This means that the detailed analysis is only carried out when necessary and not synchronously with the rough analysis, i.e., every time the rough analysis is also carried out. To wit, it may well be that the rough analysis is carried out 3 times, 8 times, 16 times, 32 times, 64 times, 128 times, or 256 times more often than the detailed analysis.

This also results in energy savings, because the information-generating device is preferably only activated when the detailed analysis is to be carried out, and/or the control device requires less energy because it does not have to reconcile the first image data from the first area scan camera with the at least one additional piece of information during the rough analysis.

In another preferred embodiment, the control device is designed to carry out the rough analysis and the detailed analysis at the same time or at different times. "At the same time" means that the same first image data from the first area scan camera are used in the rough analysis and the detailed analysis and/or that the rough analysis and the detailed analysis are carried out within an interval of less than 50 ms. The term "at different times" means that different first image data from the first area scan camera are used for the rough analysis and the detailed analysis and/or that the rough analysis and the detailed analysis are carried out one after the other within an interval of greater than 50 ms.

In another preferred embodiment, the control device is designed to examine the area to be secured or a portion of the area to be secured for an object only in the detailed analysis when the rough analysis and the detailed analysis are carried out at the same time. In this case, the remaining detection area of the first area scan camera which is not part of the area to be secured or part of the area to be secured is examined in the rough analysis for an object, with the rough analysis explicitly excluding the area to be secured or the portion of the area to be secured. This area to be secured or portion of the area to be secured is only examined for an object in the detailed analysis. This means that no area is preferably analyzed by the rough analysis and the detailed analysis at the same time. The portion of the area to be secured is an area for which no unambiguous conclusion was able to be drawn in a previous rough analysis as to whether an object is present or not. Therefore, only this portion is analyzed in greater detail by means of a detailed analysis.

In the non-simultaneous embodiment, the control device is designed to use the same first image data from the first area scan camera for the rough analysis and the detailed analysis or the most current first image data from the first area scan camera for the rough analysis and the detailed analysis. In the event that the detailed analysis is carried out after the rough analysis (or vice versa), it may well be that the respective analysis is based on different first image data because the first image data have been updated in the meantime.

In another preferred embodiment, the control device is designed to control the drive apparatus as a function of the detection of an object in the area to be secured in such a way that the door leaf is moved to the object while maintaining a minimum distance. The minimum distance can be selected arbitrarily and can, for example, be at least 10 cm, 20 cm, 30 cm, 40 cm, 50 cm, 60 cm, 70 cm, 80 cm, 90 cm, 100 cm, 120 cm, 140 cm, or at least 160 cm. The minimum distance can also be adapted as a function of the result of the detailed analysis. For example, if it is detected that the object is an older person, the minimum distance is selected so as to be larger than if the person is a younger person or an animal (for example). This ensures that the building heats up or cools down less.

In another preferred embodiment, the area to be secured for sliding doors extends on both sides of the sliding door approximately following a travel path of the door leaf. With a swing door, the area to be secured extends in front of the respective swing door in the direction of movement. In the case of revolving doors, the area to be secured extends in front of the respective door leaf and in front of the fixed secondary closing edge in the direction of movement. In the case of folding doors, the area to be secured extends on at least one side or on exactly one side of the folding door.

In another preferred embodiment, the control device is designed to carry out the detailed analysis (e.g., immediately and/or only) before the door leaf is moved and/or (e.g., only) while the door leaf is being moved. The same could also apply to the rough analysis. In that case, the detailed analysis would only be carried out when necessary, which in turn saves computing power in the control device. In that case, the detailed analysis could be carried out independently of the detection result of an object as part of the rough analysis. However, it could still be carried out as needed as a function of the detection result in the rough analysis.

In another preferred embodiment, the first area scan camera is designed to only capture 2D images. In that case, a very inexpensive area scan camera can be used which, for example, only includes resolutions of less than 10 megapixels, 8 megapixels, 6 megapixels, 4 megapixels, 3 megapixels, or less than 2 megapixels, for example.

In another preferred embodiment, the at least one piece of additional information is a structured light pattern which is contained in the first image data of the first area scan camera. The information-generating device comprises a projector which is designed to generate the structured light pattern and to radiate it into the detection area of the first area scan camera. The use of such a structured light pattern has yielded surprising results in terms of detection accuracy and cost. In addition or as an alternative, the at least one additional piece of information can also include second image data. In that case, the information-generating device is a second area scan camera which also comprises (precisely) one image sensor. This second area scan camera is preferably also designed to only capture 2D images. The optical axis of the second area scan camera deviates (significantly) from the optical axis of the first area scan camera. As a result, the first and second area scan cameras capture different areas and only overlap in a portion which forms the area to be secured. An angle between the optical axis of the first area scan camera and the optical axis of the second area scan camera is preferably greater than 10°, 15°, 20°, 25°, 30°, 35°, 40°, 45°, 50°, 55°, 60°, 65°, 70°, 75°, 80°, 85°, 90°, 95°, 100°, 105°, 110°, 115°, 120°, 125°, 130°, or greater than 140°. However, the angle is preferably less than 145°, 140°, 135°, 130°, 125°, 120°, 115°, 110°, 105°, 100°, 95°, 90°, 85°, 80°, 75°, 70°, 65°, 60°, 55°, 50°, 45°, 40°, 35°, 30°, 25°, 20°, or less than 15°. If the angle is 0°, the two optical axes would extend parallel to each other. In addition or as an alternative, the at least one piece of information can also be an illumination light that captures the first image data from the first area scan camera. In that case, the information-generating device comprises an illumination source. The illumination source is designed to generate the illumination light only for a period of time and to radiate it into the detection area of the first area scan camera, the duration of which corresponds approximately to the detailed analysis. This means that the illumination light is not permanently switched on, but rather is only switched on when necessary, namely when at least one additional piece of information is to be generated. If the detailed analysis is not called up for a longer period of time (because the door is permanently open, for example), the illumination light remains switched off.

In another preferred embodiment, the control device is designed to compare the structured light pattern in the first image data of the first area scan camera with a reference pattern. As a function of this (comparison) result, the drive apparatus is then controlled in such a way that it moves the at least one door leaf in a collision-free manner (toward the object or away from the object) or does not move it, or stops it. The reference pattern can be saved (ex works) or captured and saved in a training mode. In the event that there is no change in the area to be secured for a long period of time (e.g., for several minutes), the current structured light pattern can be saved as a new reference pattern. A comparison can be understood as a pure comparison of the pixels. However, it is also conceivable for both the first image data currently being captured and the reference pattern to be analyzed using a specific algorithm (e.g., FFT) and for these results to then be compared. In principle, a reference pattern can therefore be understood as reference image data or the result of such an algorithm that was applied to reference image data.

In addition or as an alternative, the control device is designed to calculate the first image data and the second image data in their area of overlap (preferably the area of overlap corresponds to the protection area) in order to thereby increase the resolution compared to the first image data alone or to generate spatial information. As a function of this result, which also includes the evaluation, the drive apparatus is controlled in such a way that it moves the at least one door leaf in a collision-free manner (toward the object or away from the object) or does not move it, or stops it.

In addition or as an alternative, the control device is designed to compare the first image data, which is brightened by the illumination light, with reference image data. As a function of this (comparison) result, the drive apparatus is controlled in such a way that it moves or does not move or stops the at least one door leaf without collision (toward the object or away from the object). The reference image data can be saved (ex works) or captured and saved in a training mode. In the event that there is no change in the area to be secured for a long period of time (e.g., for several minutes), the first brightened image data from the first area scan camera can be saved as new reference image data.

In another preferred embodiment, the control device is designed to carry out the detailed analysis with two or three different additional pieces of information. In that case, the information-generating device would comprise, for example, the projector and the second area scan camera or the illumination source. In principle, it would be conceivable for the first image data to include the structured light pattern and for additional first image data to be captured which then contains the brightening but not the structured light pattern. In principle, the first image data could also be calculated with the structured light pattern together with the second image data. However, the second image data could also be reconciled with the first image data without the structured light pattern.

In another preferred embodiment, the control device is designed to carry out the detailed analysis before the door leaf is moved and/or while the door leaf is being moved. The phrasing "before the door leaf is moved" preferably means that the detailed analysis is activated a few seconds {<2 s, <1 s, <0.5 s, <0.1 s) before the movement, i.e., when a command for the movement has already been generated.

In another preferred embodiment, the structured light pattern has a wavelength in the IR range. The structured light pattern is formed by patterns with different brightness distributions. The structured light pattern preferably remains constant, at least until the projector is replaced. This means that the structured light pattern preferably does not change during a door cycle (opening, closing). In addition or as an alternative, the illumination light also has a wavelength in the IR range. Such a wavelength is not visible to the human eye. As will readily be understood, the first and second area scan cameras operate in this wavelength range.

In another preferred embodiment, the structured light pattern consists of or comprises lines, dashed lines, grids, dots, and/or waves. Any shapes and patterns are conceivable in principle.

In another preferred embodiment, the lines or the dashed lines extend parallel or at an angle to the door leaf. In addition or as an alternative, the lines or the dashed lines also extend parallel to one another.

In another preferred embodiment, the distances between adjacent structures of the structured light pattern are approximately the same or vary by less than 10%, 15%, 20%, 25%, or by less than 30%.

In another preferred embodiment, the distance between two structures of the structured light pattern is less than 10 cm, 8 cm, 6 cm, or less than 4 cm. In addition or as an alternative, however, the distance is greater than 1 cm, 2 cm, 3 cm, 5 cm, 7 cm, or greater than 8 cm. In principle, the distance should be selected such that the resolution of the first area scan camera can distinguish the different structures of the structured light pattern from one another. If the first area scan camera is mounted farther away, the distance should be greater than if the first area scan camera is mounted closer to the structures.

In another preferred embodiment, the thickness of a structure of the structured light pattern is less than 8 mm, 6 mm, 4 mm, or less than 3 mm. In addition or as an alternative, the thickness of a structure of the structured light pattern is greater than 0.5 mm, 1 mm, 2 mm, or greater than 3 mm. Preferably, the thickness of such a structure had to be selected such that it encompasses at least one pixel of the first image data from the first area scan camera.

In another preferred embodiment, the automatic door system is an automatic sliding door with one, two, or more than two door leaves. The first area scan camera is arranged on a first side of the automatic sliding door. The detection area of the first area scan camera is located predominantly or completely on the first side of the automatic sliding door. The sensor device comprises a third area scan camera which comprises an image sensor. The third area scan camera preferably only captures 2D images. The third area scan camera also creates a detection area which monitors areas of the automatic door system. The third area scan camera is arranged on a second side of the automatic sliding door. The detection area of the third area scan camera is located predominantly or completely on the second side of the automatic sliding door. The detection areas of the first and third area scan cameras are preferably the same size. More preferably, they are symmetrical to one another. In a first embodiment, the projector of the information-generating device is arranged in the passage area of the automatic sliding door. This projector is then designed to generate the structured light pattern and to radiate it into the detection area of the first and third area scan cameras. In an alternative (second embodiment), the information-generating device could also comprise an additional projector. This would also be designed to generate a structured light pattern and radiate it into the detection area of the third area scan camera. The control device is then designed to compare the structured light pattern in the first image data of the first area scan camera and in the third image data of the third area scan camera with a respective reference pattern. As a function of this (comparison) result, the drive apparatus is controlled in such a way that it moves or does not move or stops the at least one door leaf without collision (toward the object or away from the object). In that case, both sides of an automatic sliding door can be monitored.

In another preferred embodiment, the automatic door system is an automatic sliding door with one, two, or more than two door leaves. The control device is designed to monitor a main closing edge of the automatic sliding door with the first area scan camera and the projector during the detailed analysis. Furthermore, a secondary closing edge of the automatic sliding door can be monitored. This is achieved with the first area scan camera and the projector or, alternatively, with an additional area scan camera and the projector or with the first area scan camera and an additional projector. Alternatively, this can be done with an additional area scan camera and an additional projector. It may well be that the monitoring area only extends parallel to the travel path of the door leaf and the actual path over which the secondary closing edge moves is not monitored. In principle, however, the respective area scan camera and the respective projector could also monitor the path of motion of the secondary closing edge.

In another preferred embodiment, the second area scan camera is not identical to the first area scan camera. For example, the first and second area scan cameras can differ in terms of the type of image sensor, the resolution, the size of the detection area, the type of optics, the orientation, and/or in the location in which they are installed. In that case, automatic door systems can be retrofitted with particular ease or defective cameras can be replaced very cost-effectively.

In another preferred embodiment, the automatic door system is an automatic sliding door with one, two, or more than two door leaves. The first area scan camera is arranged on a first side of the automatic sliding door, and the second area scan camera is arranged on a second side of the automatic sliding door. The first and second area scan cameras are arranged in the passage area of the automatic sliding door in such a way that, in a first alternative, a portion of the detection area of the second area scan camera extends to the first side of the automatic sliding door when the sliding door is at least partially open and overlaps with the detection area of the first area scan camera. The control device is then designed to calculate the first and second image data in the area of overlap (particularly the area to be secured) on the first side of the automatic sliding door in the detailed analysis. This allows the resolution to be increased and spatial information to be generated. As a function of these additional results, the drive apparatus can be controlled in such a way that it moves or does not move or stops the at least one door leaf without collision (toward the object or away from the object).

In addition or as an alternative, the first and second area scan cameras are arranged at the passage area of the automatic sliding door in such a way that, in a second alternative, a portion of the detection area of the first area scan camera extends to the second side of the automatic sliding door when the sliding door is at least partially open and overlaps with the detection area of the second area scan camera. The control device is then designed to calculate the first and second image data in the area of overlap (particularly the area to be secured) on the second side of the automatic sliding door in the detailed analysis. This allows the resolution to be increased and spatial information to be generated. As a function of these additional results, the drive apparatus can be controlled in such a way that it moves or does not move or stops the at least one door leaf without collision (toward the object or away from the object).

In another preferred embodiment, the automatic door system is an automatic sliding door with one, two, or more than two door leaves. The control device is designed to monitor a main closing edge of the automatic sliding door with the first area scan camera and the second area scan camera in the detailed analysis. Furthermore, a secondary closing edge of the automatic sliding door can be monitored with the first area scan camera and the second area scan camera. Alternatively, this secondary closing edge can also be monitored with an additional area scan camera and the second area scan camera. Alternatively, this secondary closing edge can also be monitored with the first area scan camera and an additional area scan camera. Alternatively, this secondary closing edge can also be monitored with two additional area scan cameras. It may well be that the monitoring area only extends parallel to the travel path of the door leaf and the actual path over which the secondary closing edge moves is not monitored. In principle, however, the respective area scan camera could also monitor the path of motion of the secondary closing edge.

In another preferred embodiment, the illumination source is a flash light or a pulsed light source. This flash fires synchronously with the image capture performed by the first area scan camera. This means that the flash fires when the photo sensor of the first area scan camera captures the incident light. It is especially advantageous here that the illumination source is not permanently switched on and is also able to radiate a high light output for short-term activation without overheating. This means that the detection rate of any objects in the first image data is particularly high. When using a pulsed light source, many light pulses are generated one after the other. The duration of a light pulse is preferably shorter than the time in which the image is captured. It may well be that a plurality of images have to be captured, with only that image being selected in order to determine whether an object is in the area to be secured or not on whose capture the product of the additional illumination source is visible by means of light pulses. It is also possible for only those first image data to be used in which sufficient light from the pulsed light source is contained as additional information. “Sufficient light” means that the light intensity of the pulsed light source is above a threshold value.

The pulsed light source therefore need not be controlled synchronously with the capture of the first area scan camera. It can be controlled asynchronously to the first area scan camera.

The first and/or second area scan camera or an additional area scan camera preferably allow IR light to pass through in the wavelength of the additional illumination source. Preferably, an IR pattern and/or the image of an IR illumination can thus be recognized with the area scan camera.

In another preferred embodiment, the control device receives the additional information exclusively from (exactly) one area scan camera. IR photodiodes that are not part of the area scan camera are not used to monitor the area to be secured.

In another preferred embodiment, a building is equipped with such an automatic door system. The building comprises walls, with a passageway being provided in the walls. The automatic door system is installed in this passage.

In another preferred embodiment, a method for operating this automatic door system is specified. In a first method step, image data from the first area scan camera, which cover a first detection area, are transmitted to the control device together with the at least one additional piece of information. In a second method step, it is determined whether the door leaf can be moved safely. To this end, the image data are used together with the at least one additional piece of information. In a third method step, the door leaf is moved if no danger is posed by objects.

Various embodiments of the invention are described below for the sake of example with reference to the drawings. Same or similar objects have the same reference symbols.

DETAILED DESCRIPTION OF THE FIGURES

Figure 1A:
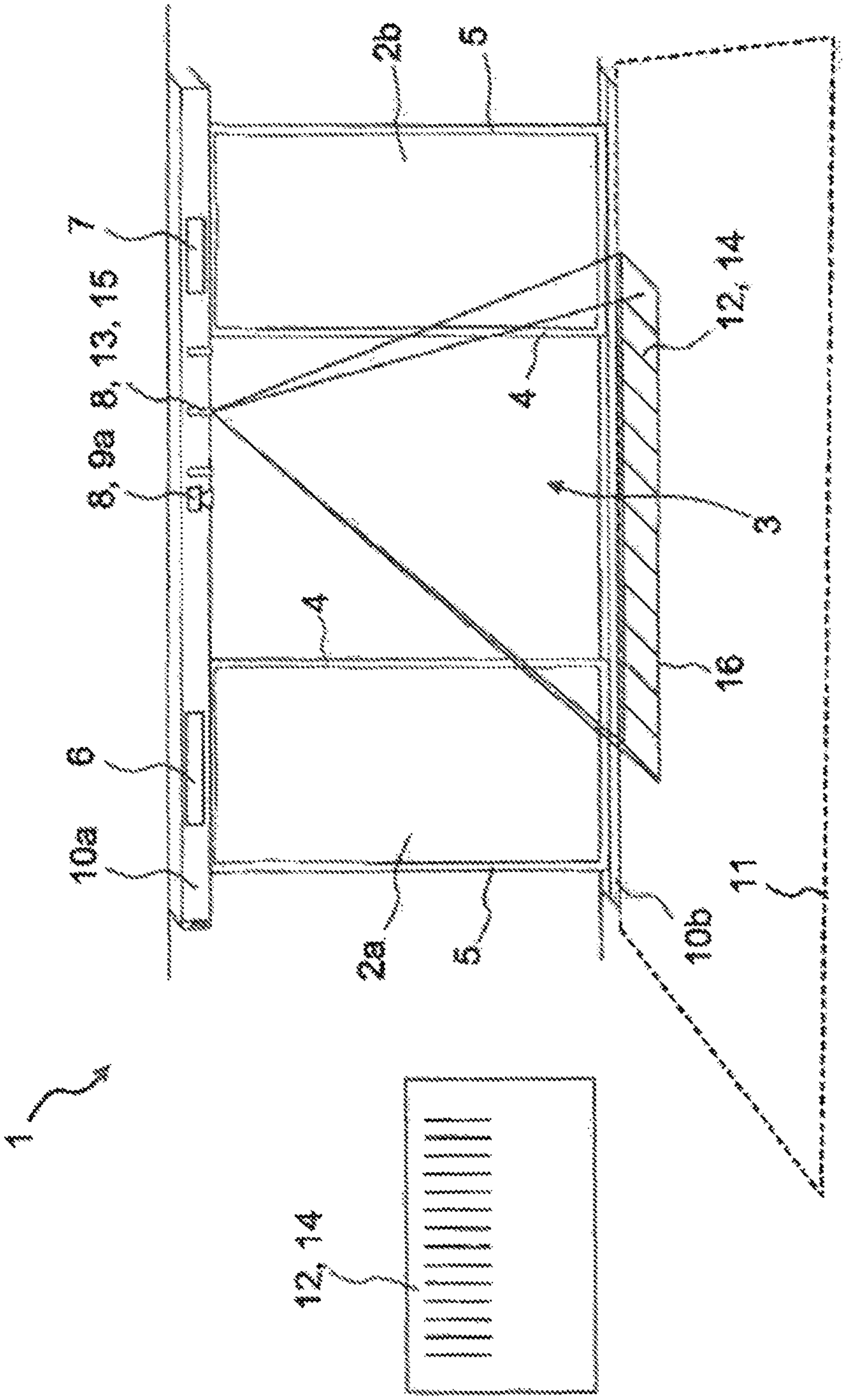
FIGS. 1A and 1B show an area to be secured of a sliding door which is monitored with a first area scan camera and a structured light in the form of lines.

An automatic door system 1 according to the invention is described below. The automatic door system 1 can be used in buildings. The automatic door system comprises at least one door leaf 2*a*, 2*b*. This at least one door leaf 2*a*, 2*b* can be moved along a travel path. FIG. 1A shows a door system 1 in the form of an automatic sliding door. The automatic sliding door comprises a first and a second door leaf 2*a*, 2*b* which can be moved toward one another in order to close a passage area 3 in this case or away from one another in order to unblock a passage area 3 in this case. The first and second door leaves 2*a*, 2*b* comprise a main closing edge 4, with the main closing edges 4 of the first and second door leaves 2*a*, 2*b* adjoining one another and preferably touching one another when the sliding door is closed. Secondary closing edges 5 are arranged opposite the respective main closing edge 4. The first and second door leaves 2*a*, 2*b* comprise a frame which preferably holds a glass pane.

A (fully) open state of the sliding door is shown in FIG. 1A. The first and second door leaves 2*a*, 2*b* can be moved by motorized means. A drive apparatus 6 is available for this. This comprises at least one electric motor. There is preferably exactly one electric motor by means of which all door leaves 2*a*, 2*b* can be driven. However, there can also be one electric motor per door leaf 2*a*, 2*b*.

A control device 7 is also provided. This is designed to control the drive apparatus 6 in such a way that it moves the at least one door leaf 2*a*, 2*b* or, in the case of FIG. 1A, the first and second door leaves 2*a*, 2*b*.

Furthermore, the automatic door system 1 comprises a sensor device 8. The sensor device 8 comprises a first area scan camera 9*a*. The first area scan camera 9*a* is designed to only capture 2D images. The first area scan camera 9*a* therefore comprises, in particular, exactly one image sensor and more preferably exactly one optical axis.

The automatic door system 1 preferably also comprises an upper profile assembly 10*a* which is arranged above the first and second door leaves 2*a*, 2*b* and is particularly fastened to a supporting structure of a building (for example a wall, ceiling). The drive apparatus 6 and the control device 7 are preferably also arranged in the upper profile assembly 10*a*. It is also preferred if the first area scan camera 9*a* is also arranged on or in this upper profile assembly 10*a*.

It is also preferred if there is also a lower profile assembly 10*b* which is arranged below the first and second door leaves 2*a*, 2*b* and is particularly fastened to or in the floor of a building. The lower profile assembly 10*b* preferably comprises a guide rail into which the first and second door leaves 2*a*, 2*b* engage with a guide arm or guide blade. Drainage via appropriate drainage channels can also take place via the lower profile assembly 10*b*.

The first area scan camera is designed to generate first image data from a detection area 11, with the automatic door system 1 being monitorable in this detection area 11. The control device 7 is designed to receive this first image data from the detection area 11 of the first area scan camera 9*a* and to evaluate it for the presence of an object (object, person, animal). If, for example, a person is recognized, the drive apparatus 6 is controlled in such a way that it moves the door leaves 2*a*, 2*b* into an open position, thereby unblocking the passage area 3. After a certain time has elapsed, the door leaves 2*a*, 2*b* are preferably moved back into a closed position if no object is detected. As will readily be understood, cross-traffic suppression is also possible, so that the door leaves 2*a*, 2*b* are not moved into an open position if it is detected that a person is merely walking past the door leaves 2*a*, 2*b*.

The analysis of this first image data takes place at regular time intervals, preferably several times per second. In that case, the detection area 11 extends on a first side of the sliding door, preferably over a width that corresponds to the length of a travel path of the first and second door leaves 2*a*, 2*b*.

The first area scan camera 9*a* preferably operates in the IR range (infrared). However, it could also operate in the wavelength range of light that is visible to humans.

The control device 7 is also designed to determine whether the first and/or second door leaves 2*a*, 2*b* can be moved safely (i.e., in a collision-free manner) by means of a detailed analysis—which can also be referred to as a detailed analysis procedure—based on at least part or all of the first image data from the first area scan camera 9*a* and at least one additional piece of information 12. In this context, the sensor device 8 also comprises an information-generating device 13, which is separated (spatially, for example) from the first area scan camera 9*a* (spaced attachment to the upper profile assembly 10*a*, separate housing, etc.) and contributes to the generation of the at least one additional piece of information 12.

In FIG. 1A, the additional information 12 is a structured light pattern 14. In this case, the information-generating device 13 comprises a projector 15 which, in particular, comprises a laser for generating and radiating the structured light pattern 14. The projector preferably operates in the IR range and is also preferably integrated on or into the upper profile assembly 10*a*.

The control device 7 is designed to compare the structured light pattern 14 in the first image data of the first area scan camera 9*a* with a reference pattern in order to control the drive apparatus 6 as a function of the result in such a way that it moves the at least one door leaf 2*a*, 2*b* in a collision-free manner or does not move it, or stops it. In FIG. 1A, an enlarged section of the structured light pattern 14 is shown in the area to the left.

The structured light pattern 14 is preferably only radiated into a portion of the detection area 11 of the first area scan camera 9*a*. This portion is referred to as the area to be secured 16. It preferably extends 20 cm away from the respective door leaf 2*a*, 2*b*.

The control device 7 is designed to examine the area to be secured 16 for the presence of an object 17 with a greater level of accuracy. The remaining detection area 11 is examined for an object 17 with a lower resolution as part of a rough analysis, which can also be referred to as a rough analysis procedure. As part of the detailed analysis, it should be determined whether there is an immediate danger to an object 17 in the immediate vicinity of the movable door leaf 2*a*, 2*b*.

In principle, rough analysis and detailed analysis can be carried out at the same time. However, the detailed analysis is preferably only carried out when necessary, namely when the respective door leaf 2*a*, 2*b* is to be moved or is currently being moved. In principle, the rough analysis and the detailed analysis could also be carried out at different times. The detailed analysis can also only be carried out for a portion of the area to be secured 16.

When multiple door leaves 2*a*, 2*b* are used, for example in the context of a sliding door as shown in FIG. 1A, the individual door leaves 2*a*, 2*b* can be moved independently of one another as a function of the position of the object 17. If the control device 7 comes to the conclusion as part of the detailed analysis that a collision probability exists only for one door leaf 2*a*, 2*b*, the other door leaf 2*a*, 2*b* can be moved normally.

Figure 1B:
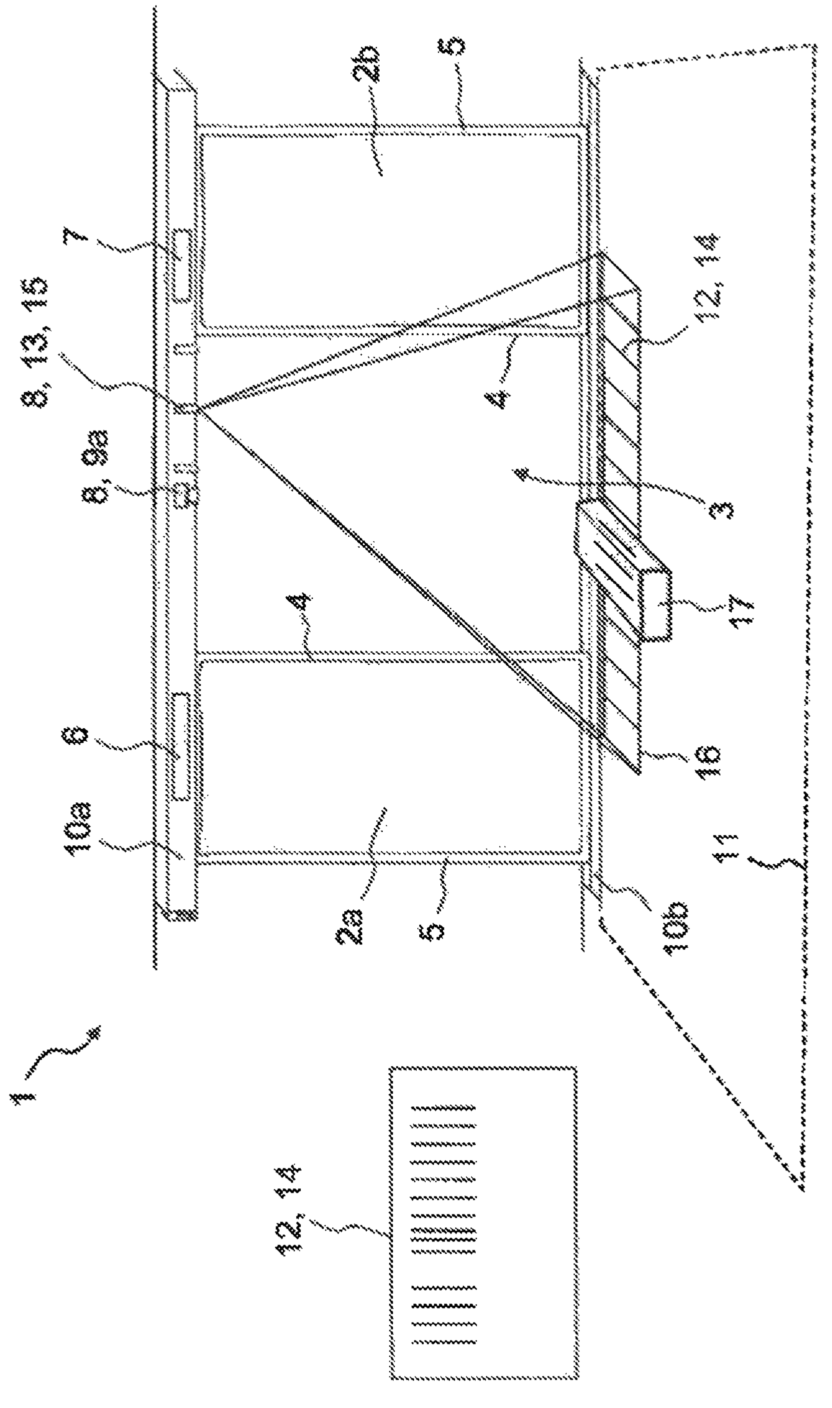

FIG. 1B shows a change in the structured light pattern 14 when the structured light pattern 14 strikes an object 17. The structured light pattern 14 which is contained in the captured first image data of the first area scan camera 9*a* no longer corresponds to a reference pattern (see FIG. 1A), because the positions of the individual structures are changed or distorted in position compared to the reference pattern. In this case, the structured light pattern 14 comprises lines that preferably extend perpendicular to the first or second door leaf 2*a*, 2*b*. The distance between the individual lines changes due to the presence of an object 17. This change can be detected in order to enable the presence of an object 17 to be deduced therefrom. The detection can be performed by means of a pixel comparison, for example, or it can also be the result of an algorithm (e.g., FFT). Based on the structured light pattern 14 and its change, a three-dimensional shape of the object 17 can also be calculated by the control device 7. The structured light pattern 14 has a wavelength that is preferably in the IR range. The structured light pattern 14 is formed by patterns (in this case, lines) with a different brightness distribution. The lines may be formed by lighter sections than the rest (and vice versa).

Preferably, the distances between adjacent structures (in this case, lines) are approximately the same. They can also vary in the reference pattern by less than 10%, 15%, 20%, 25%, or less than 30%. In principle, the assembly of the structures can be arbitrary as long as this assembly does not change continuously during operation. The reference pattern can be image data, enabling a pixel comparison to be carried out, for example. However, the reference pattern can also be a result of an algorithm that was applied to captured image data.

The distance between two structures of the structured light pattern 14 is preferably less than 10 cm, 8 cm, 6 cm, or less than 4 cm. However, it is preferably greater than 1 cm, 2 cm, 13 m, 5 cm, 7 cm, or greater than 9 cm.

The thickness of a corresponding structure (for example, line) of the structured light pattern 14 which is preferably illuminated more brightly than the rest is, for example, less than 8 mm, 6 mm, 4 mm or less than 3 mm. However, it is preferably greater than 0.5 mm, 1 mm, 2 mm, or greater than 3 mm.

Figure 2A:
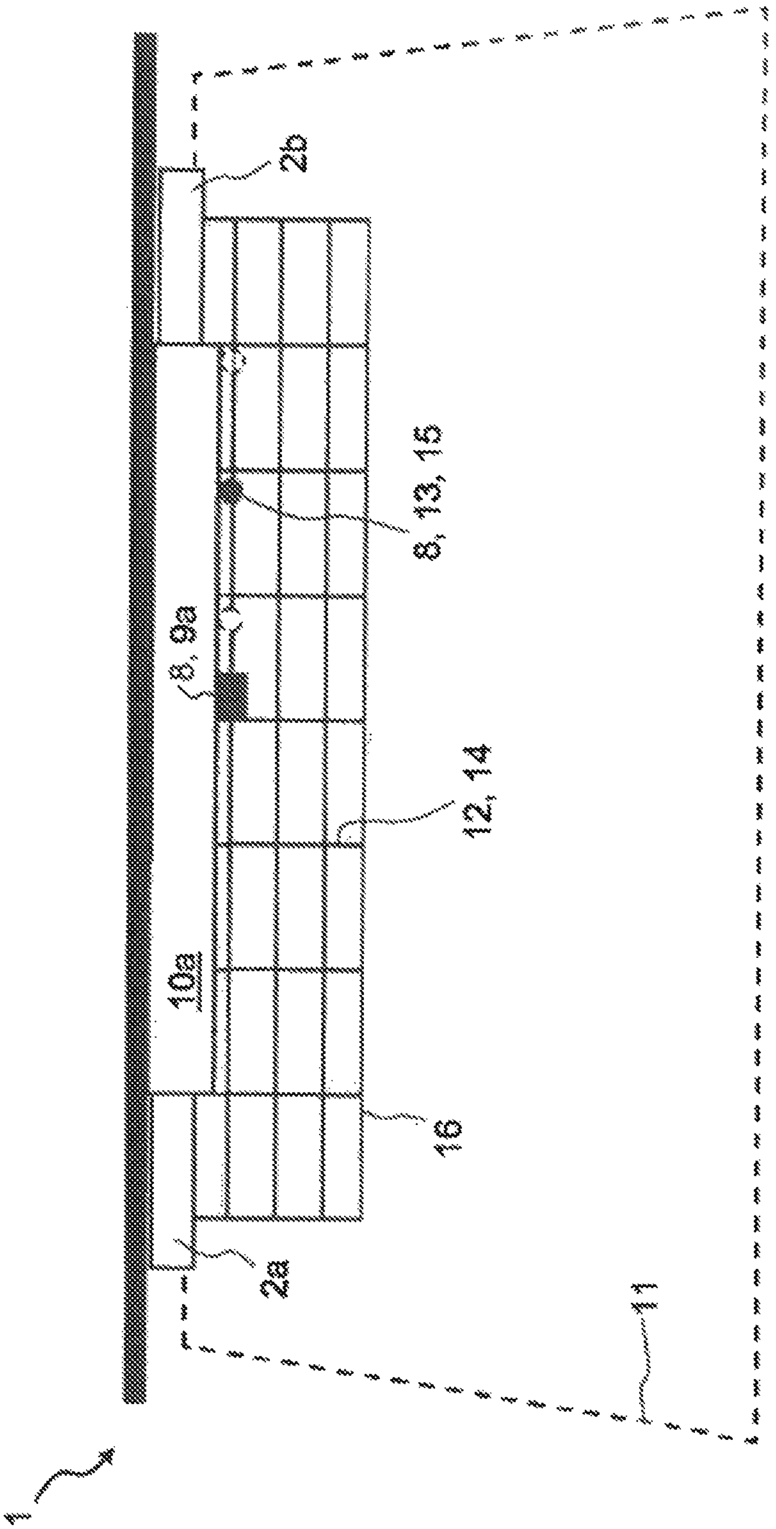
FIGS. 2A, 2B, 2C, 2D show different patterns of structured light.

FIGS. 2A, 2B, 2C and 2D show various plan views of the automatic door system 1 in the form of a sliding door from which the shape of the structured light pattern 14 emerges. In FIG. 2A, the structured light pattern 14 has a grid-shaped structure and comprises parallel lines and lines perpendicular thereto. Additional positions at which the projector 15 of the information-generating device 13 could be mounted are illustrated by hollow circles. It can be seen that the first area scan camera 9*a* and the information-generating device 13 are separate objects.

Figure 2B:
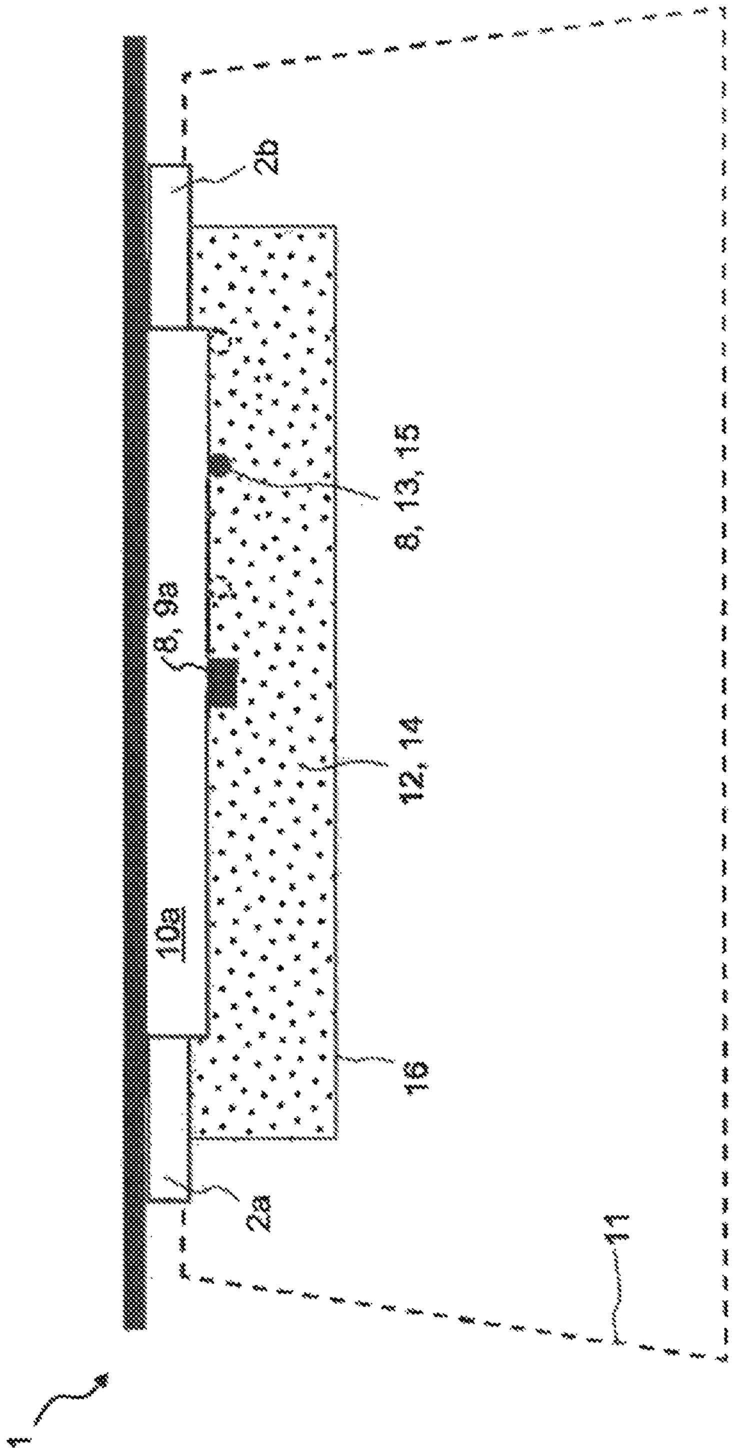

In FIG. 2B, the structured light pattern comprises 14 dots. These can be distributed as desired, although they must have an appropriate diameter that can still be resolved by the first area scan camera 9*a*. The distance between the dots should not be too large, so that objects and people can be reliably detected.

Figure 2C:
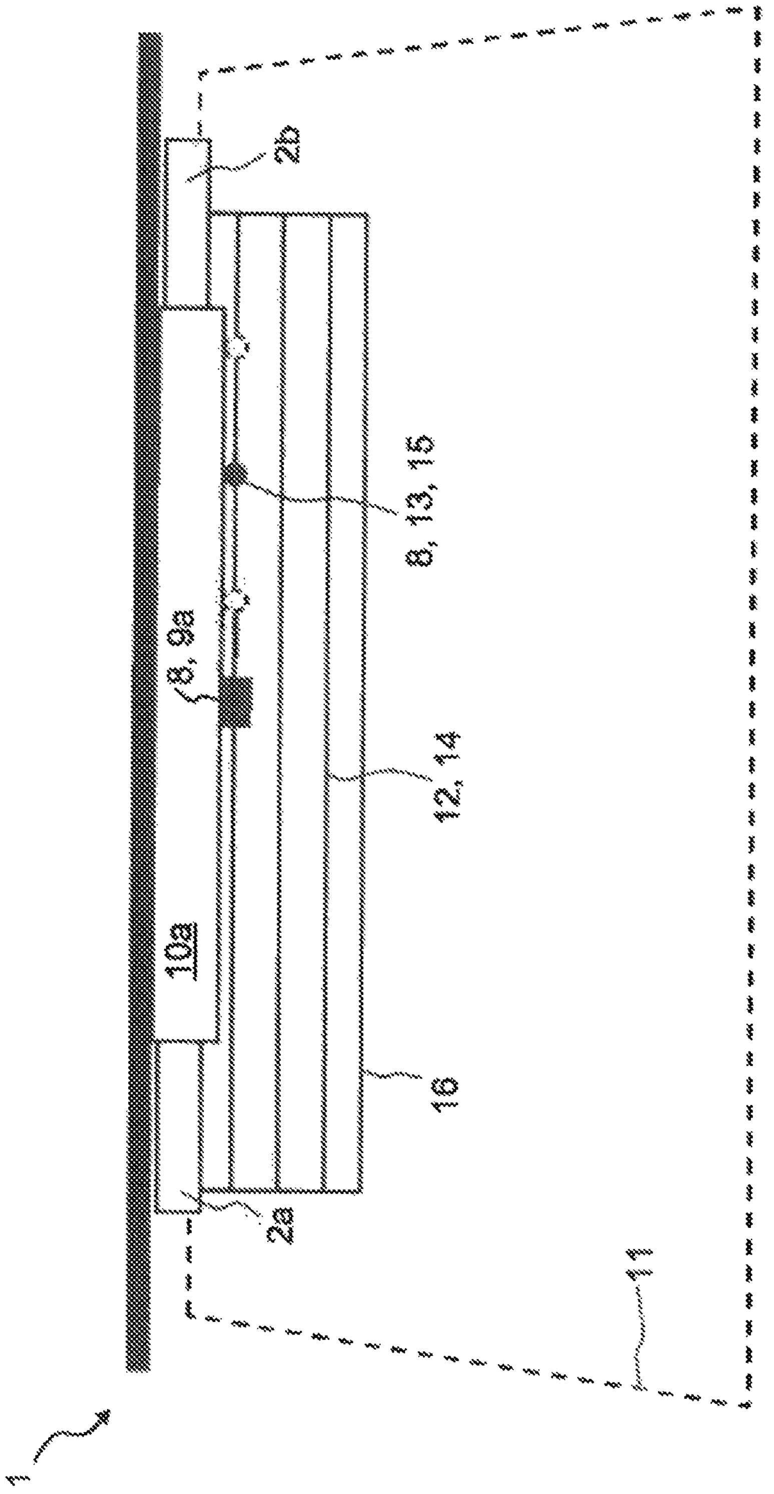

In FIG. 2C, the structured light pattern 14 is again lines which, in this case, extend parallel to the first and second door leaves 2*a*, 2*b*.

Figure 2D:
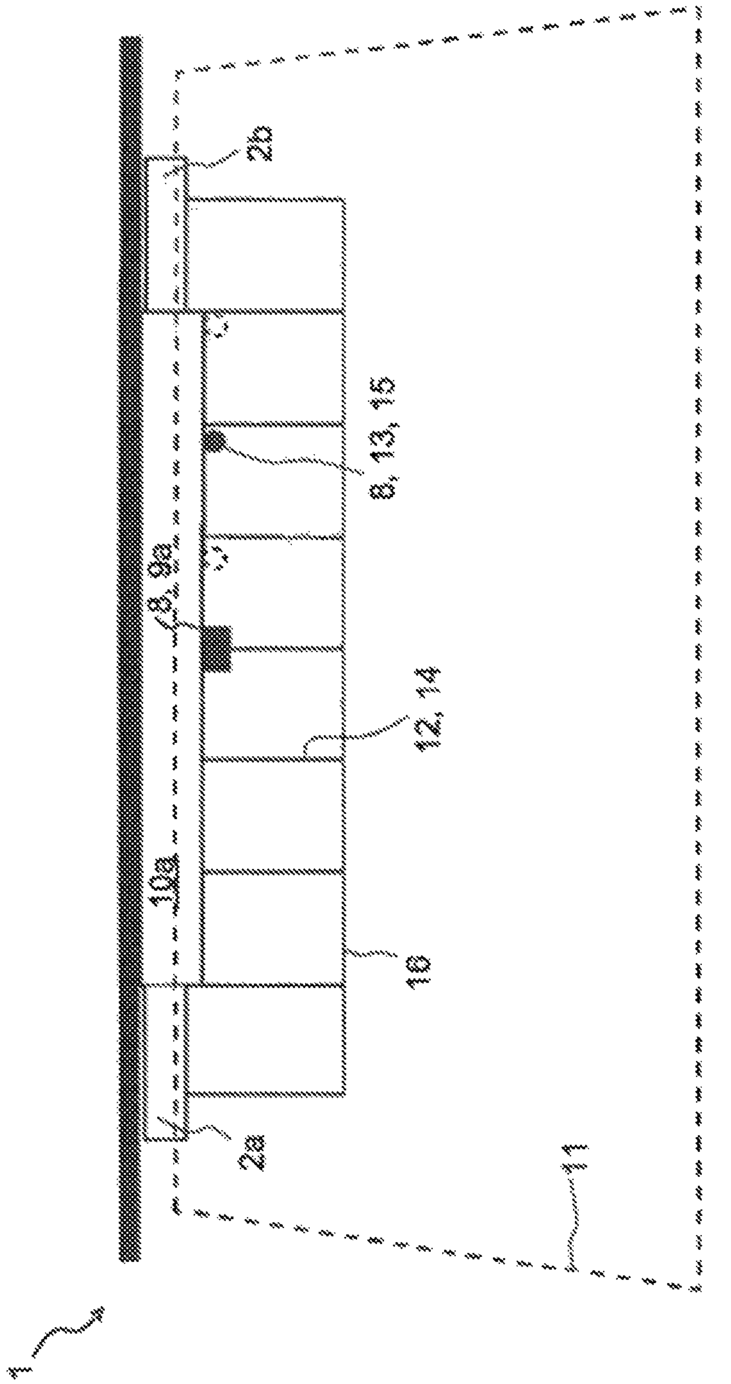

In FIG. 2D, the structured light pattern 14 is again lines, which, in this case, extend perpendicular to the first and second door leaves 2*a*, 2*b*.

The structured light pattern 14 could also comprise dashed lines or waves or another shape.

Figure 3A:
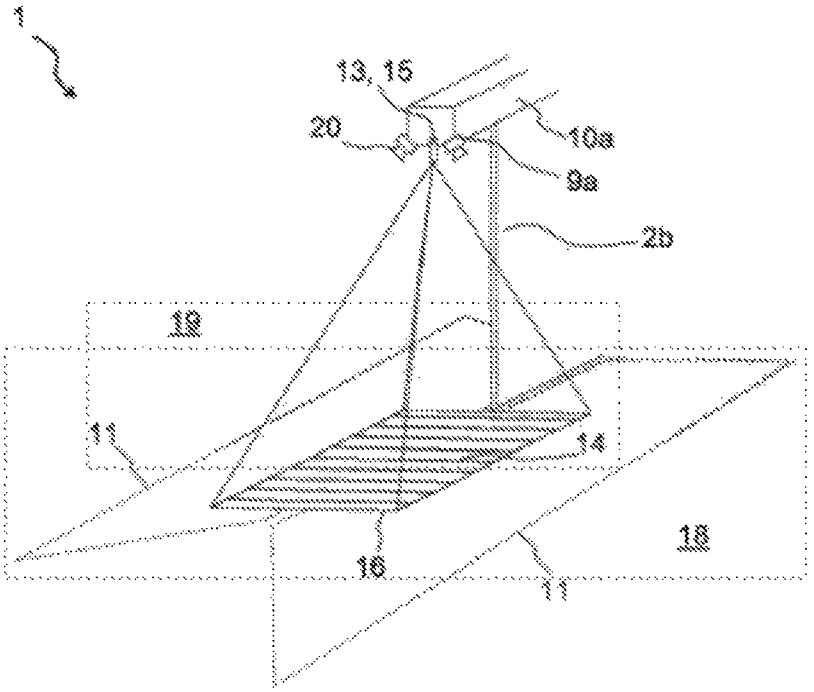
FIGS. 3A and 3B show an exemplary embodiment of a sliding door system with two area scan cameras and a projector for generating at least one piece of additional information.
Figure 3B:
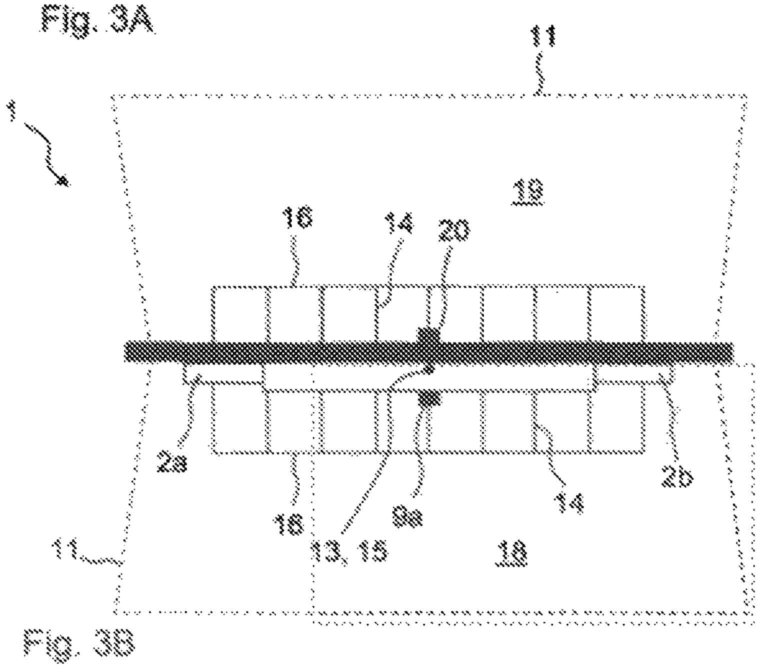

FIGS. 3A and 3B show another exemplary embodiment of the automatic door system 1. The first area scan camera 9*a* is arranged on a first side 18 of the automatic sliding door. The capture range of the first area scan camera 9*a* also extends on this first side 18. The sensor device 8 further comprises a third area scan camera 20 which generates third image data from a detection area, which also monitors areas of the automatic door system 1. The third area scan camera 20 is arranged on a second side 19 or monitors a second side 19.

In this case, the detection area 11 of the first area scan camera 9*a* lies entirely on the first side 18. In this case, the detection area 11 of the third area scan camera 20 lies entirely on the second side 19.

In this case, the projector 15 of the information-generating device 13 is arranged in the passage area 3 and is designed to generate the structured light pattern 14 and to radiate it into the detection area 11 of the first and third area scan cameras 9*a*, 20.

The control device 7 is designed to compare the structured light pattern 14 in the first image data of the first area scan camera 9*a* and in the third image data of the third area scan camera 20 with a respective reference pattern (reference pattern for the first area scan camera 9*a* and reference pattern for the third area scan camera 20) in order to control the drive apparatus 6 as a function of the result in such a way that it moves the at least one door leaf 2*a*, 2*b* in a collision-free manner or does not move it, or stops it.

The first and third area scan cameras 9*a*, 20 can be identical or different from each other. Differentiating features could, for example, lie in the type of image sensor, the resolution, the size of the detection area, the optics, and/or the orientation.

Figure 4A:
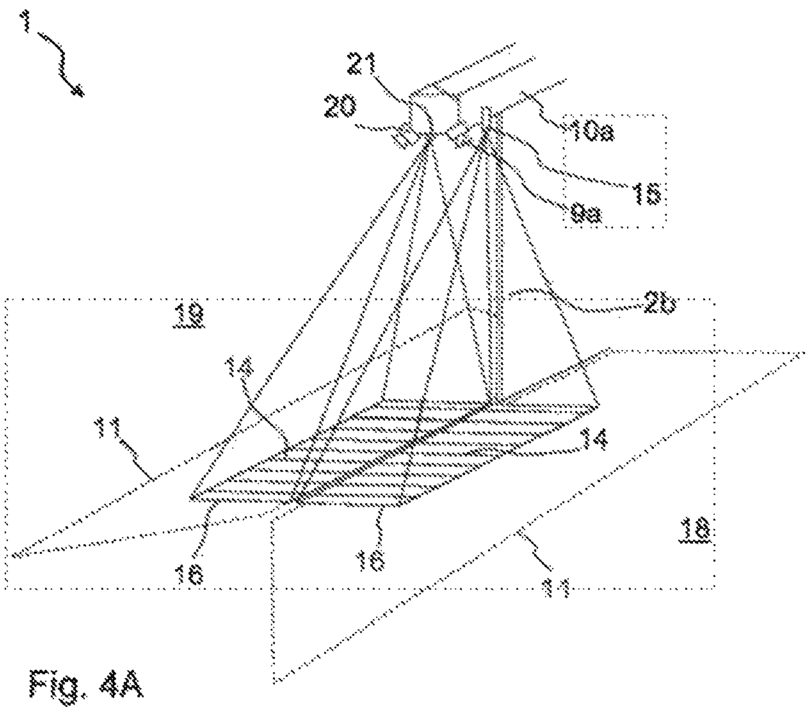
FIGS. 4A and 4B show an exemplary embodiment of a sliding door system with two area scan cameras and two projectors for generating at least one piece of additional information.
Figure 4B:
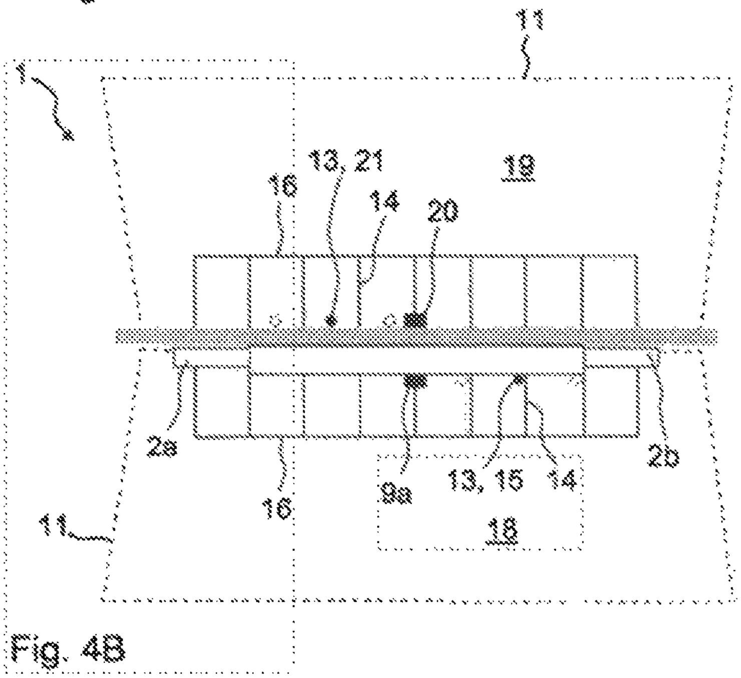

FIGS. 4A and 4B show another exemplary embodiment of the automatic door system 1. In contrast to FIGS. 3A, 3B, the information-generating device 13 comprises an additional projector 21. The projector 15 is preferably arranged on the first side 18 of the automatic sliding door, whereas the additional projector 21 is arranged on the second side 19 of the automatic sliding door. The structured light patterns 14 of both projectors 15, 21 preferably do not overlap. In principle, the structured light patterns 14 of both projectors 15, 21 can also partially overlap.

The additional projector 21 generates a structured light pattern 14 and radiates this into the detection area 11 of the third area scan camera 20 on the second side 19 of the automatic sliding door.

Figure 5A:
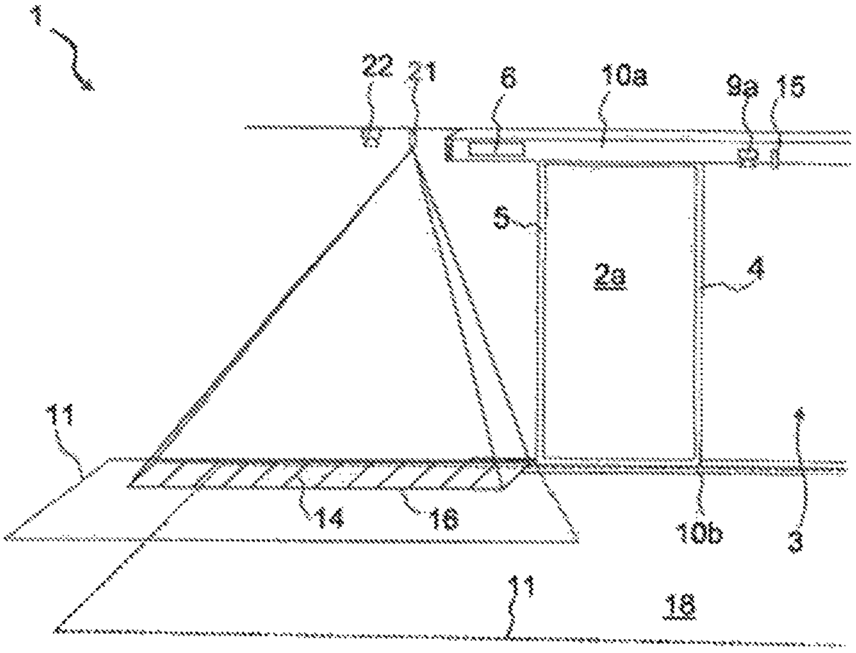
FIGS. 5A and 5B show an exemplary embodiment of a sliding door system for monitoring a secondary closing edge with an area scan camera and a projector.
Figure 5B:
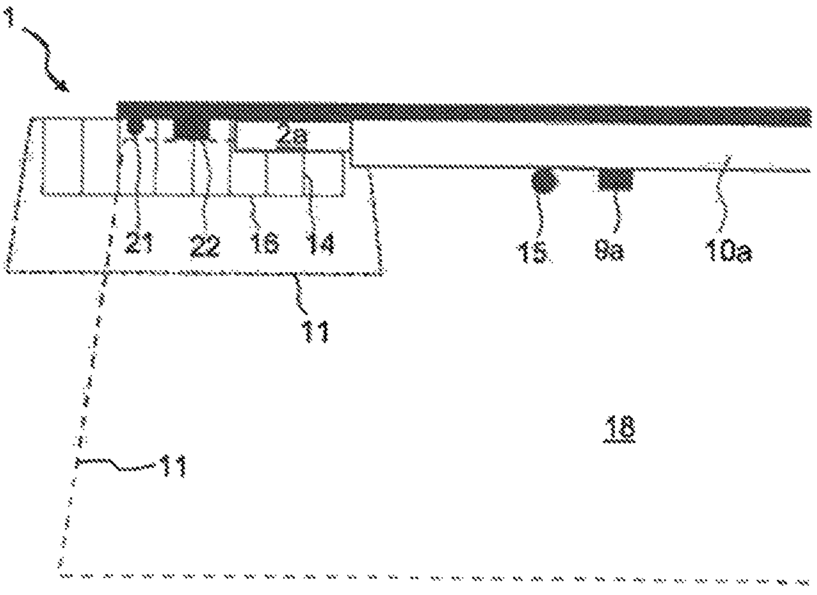

FIGS. 5A, 5B show the automatic door system 1 in the form of an automatic sliding door. The control device 7 is designed to monitor a main closing edge 4 with the first area scan camera 9*a* and the projector 15 during the detailed analysis. In this case, the secondary closing edge 5 of the first or second door leaf 2*a*, 2*b* can be monitored with an additional area scan camera 22 and an additional projector 21. The structured light patterns 14 of the projector 15, which monitors the main closing edge 4, and of the additional projector 21, which monitors the secondary closing edge 5, are preferably arranged with no overlap or predominantly no overlap with one another. In this case, two areas to be secured 16 would be monitored in the detailed analysis. An area to be secured 16 (not shown) would target the main closing edge 4, and another area to be secured 16 would target the secondary closing edge 5. Depending on the travel path of the door leaf 2*a*, 2*b* (opening, closing), only one area to be secured 16 would preferably be monitored in the detailed analysis. If the door leaf 2*a*, 2*b* is to be opened, only the area to be secured 16 for the secondary closing edge 5 would preferably be monitored. If the door leaf 2*a*, 2*b* is to be closed, only the area to be secured 16 (not shown) for the main closing edge 4 would preferably be monitored. The area to be secured 16 for the secondary closing edge 5 preferably also covers the actual travel path of the respective door leaf 2*a*, 2*b* and preferably extends over the lower profile assembly 10*b*.

In this case, the additional area scan camera 22 comprises its own detection area 11. This detection area can be congruent with the detection area 11 of the first area scan camera 9*a*. In FIGS. 5A, 5B, the detection areas 11 of the first and additional area scan cameras 9*a*, 22 overlap only partially. They can also be arranged so as to be completely without overlap relative to one another.

In principle, it would also be conceivable for the secondary closing edge 5 to be monitored with the first area scan camera 9*a* and the projector 15. Monitoring with an additional area scan camera 22 and the known projector 15 would also be conceivable. Monitoring can also be performed with the first area scan camera 9*a* and an additional projector 21.

The first and the additional area scan cameras 9*a*, 22 can be identical or different from one another. Distinctive features can lie, for example, in the type of image sensor, the resolution, the size of the detection area, the optics, and/or the orientation.

Figure 6A:
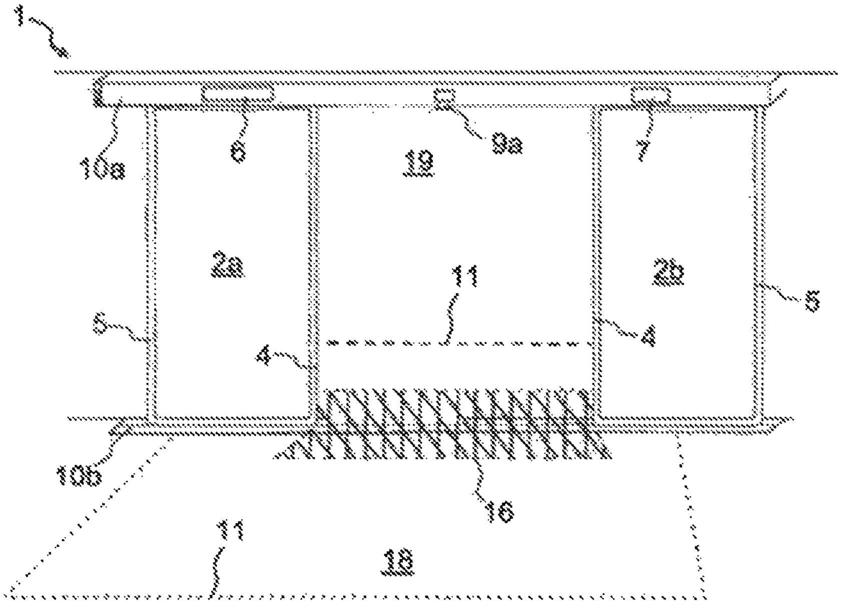
FIGS. 6A, 6B and 6C show an exemplary embodiment of a sliding door system with two area scan cameras, the additional information being generated with an area scan camera in order to monitor the passage area.
Figure 6B:
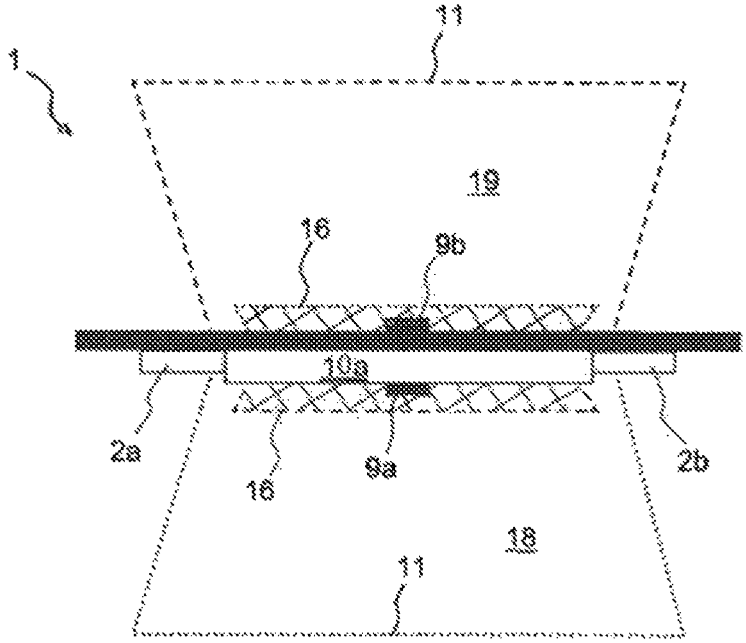
Figure 6C:
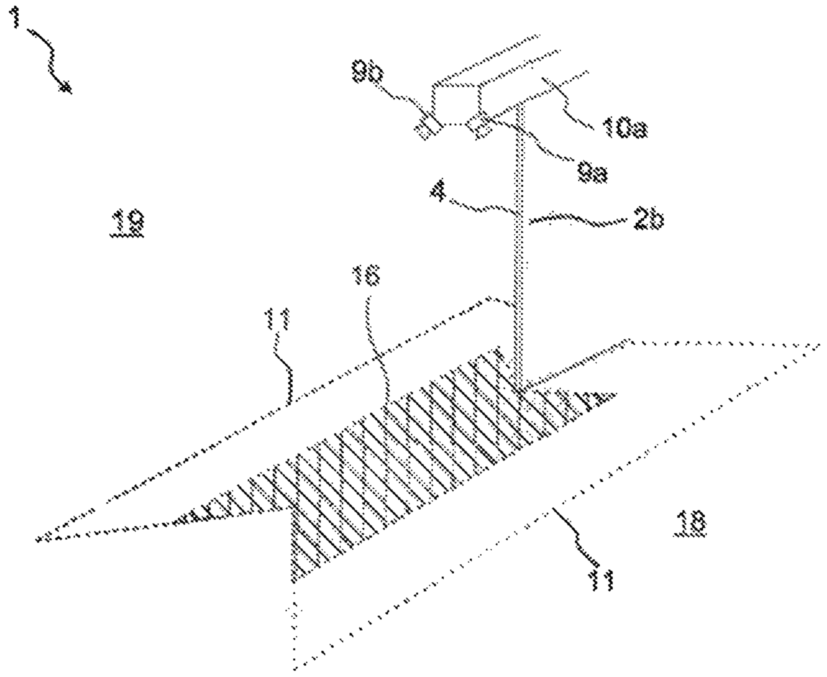

Another exemplary embodiment of the automatic door system 1 is described in FIGS. 6A, 6B, 6C. In this case, the at least one additional piece of information 12 is second image data. In this case, the information-generating device 13 comprises a second area scan camera 9*b*. This preferably also comprises (precisely) one image sensor and thus more preferably (precisely) one optical axis. The second area scan camera 9*b* is designed to generate second image data. Only a portion of the detection area 11 of the first area scan camera 9*a* is overlapped by the detection area 11 of the second area scan camera 9*b*. The first area scan camera 9*a* is mounted on the first side 18 and the second area scan camera 9*b* on the second side 19 or is predominantly aligned with this side, with the detection area 11 of the first area scan camera 9*a* extending predominantly to the first side 18 and the detection area 11 of the second area scan camera 9*b* extending predominantly to the second side 19.

The detection area 11 of the second area scan camera 9*b* overlaps with a portion of the detection area 11 of the first area scan camera 9*a* on the first side 18. This area of overlap then forms the area to be secured 16. The control device 7 is designed to calculate the first and second image data in this area of overlap in order to increase the resolution or generate spatial information. As a function of this result, the drive apparatus 6 can be controlled in such a way that it moves the at least one door leaf in a collision-free manner or does not move it, or stops it.

Preferably, the detection area 11 of the first area scan camera 9*a* also overlaps with a portion of the detection area 11 of the second area scan camera 9*b* on the second side 19 of the sliding door. This area of overlap then forms the area to be secured 16 on the second side 19 of the sliding door. The control device 7 is designed to calculate the first image data and the second image data in this area of overlap in order to increase the resolution or generate spatial information. As a function of this result, the drive apparatus 6 can be controlled in such a way that it moves the at least one door leaf in a collision-free manner or does not move it, or stops it.

In principle, however, it would also be conceivable for an additional area scan camera 22 to be oriented toward the first or second side 18, 19, over whose detection area 11 the area to be secured 16 is formed. In this case, there would be two area scan cameras per side 18, 19.

Figure 7A:
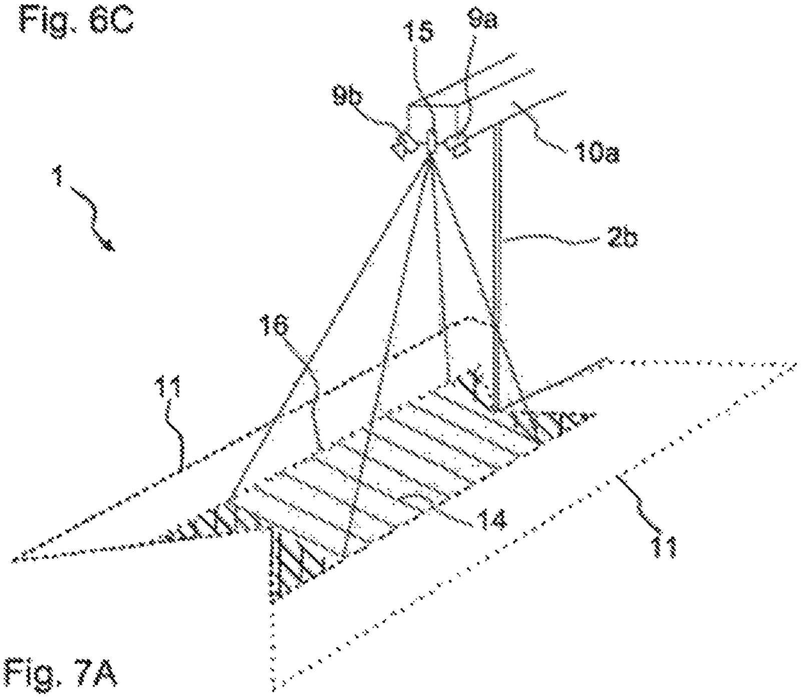
FIGS. 7A, 7B and 7C show an exemplary embodiment of a sliding door system with two area scan cameras and a projector for generating multiple additional pieces of information.
Figure 7B:
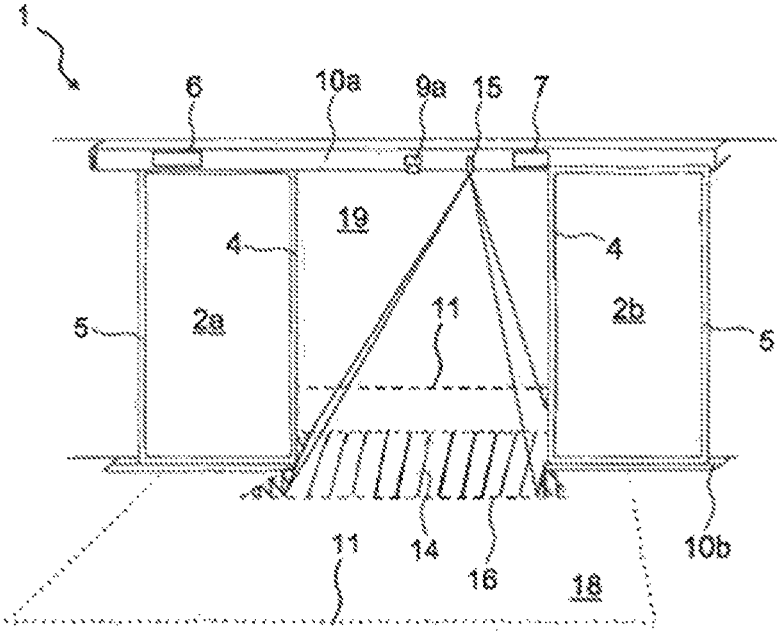
Figure 7C:
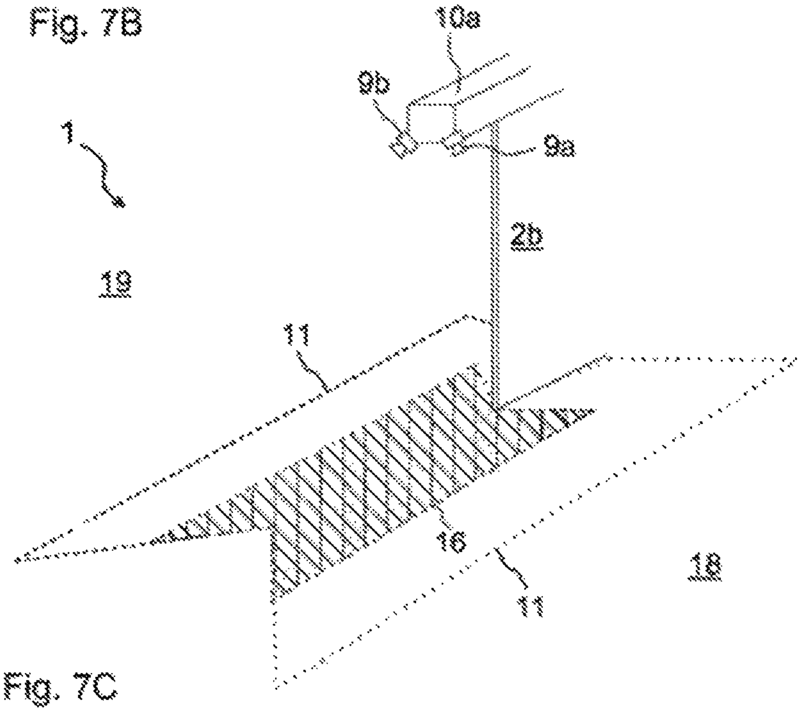

FIGS. 7A, 7B and 7C show that it is also possible to use more than one additional piece of information 12 at the same time. In this case, the control device 7 is designed to carry out the detailed analysis with two or three different additional pieces of information 12. In this exemplary embodiment, second image data from the second area scan camera 9*b* is used and calculated with the first image data from the first area scan camera 9*a* in order to achieve greater accuracy as to whether there is an object 17 in the area to be secured 16 on the first side 18. Furthermore, a structured light pattern 14 can also be used via a projector 15 in order to further increase the accuracy in order to determine particularly reliably whether there is an object 17 in the area to be secured 16 on the first side 18. The projector 15 is arranged in the passage area 3 and radiates the structured light pattern 14 both on the first side 18 and on the second side 19. The exemplary embodiment of FIGS. 7A, 7B, 7C is therefore a mixture of the exemplary embodiment of FIGS. 3A, 3B and 6A, 6B, 6C.

Figure 8A:
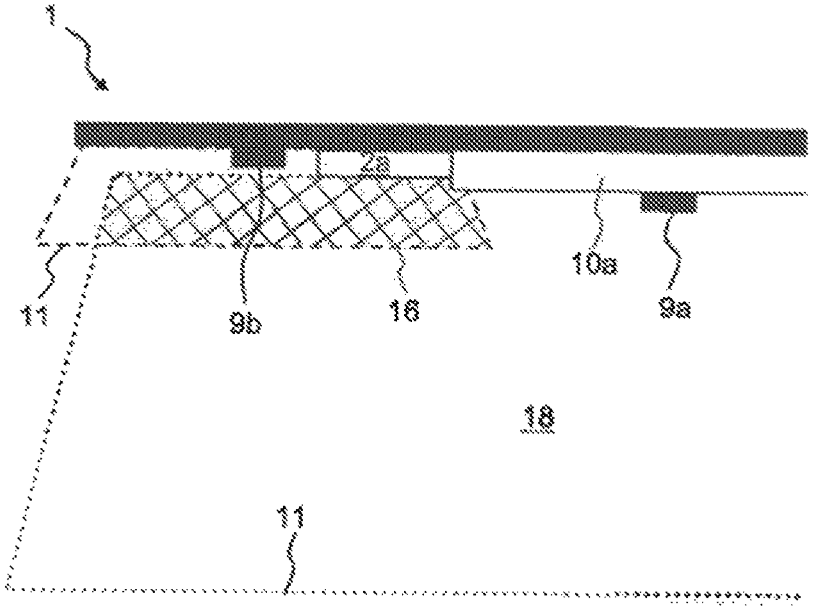
FIGS. 8A and 8B show an exemplary embodiment of a sliding door system, with the additional information being generated with a second area scan camera in order to monitor a secondary closing edge.
Figure 8B:
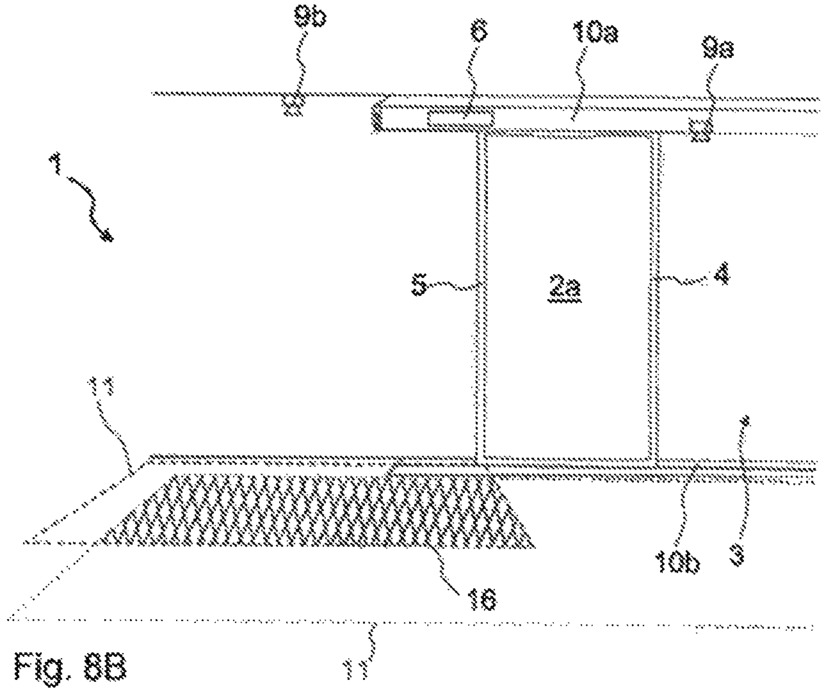

FIGS. 8A and 8B describe that the secondary closing edge 5 can also be monitored using two area scan cameras. In principle, it is possible for the secondary closing edge 5 to be monitored with the first area scan camera 9*a* and the second area scan camera 9*b*. The main closing edge 4 is preferably also monitored with these two area scan cameras 9*a*, 9*b*. The area of overlap of the two detection areas 11 of the first and second area scan cameras 9*a*, 9*b* is preferably the area to be secured 16. It would also be possible for the secondary closing edge 5 to be monitored with the first area scan camera 9*a* and with an additional area scan camera 22. In principle, the secondary closing edge 5 could also be monitored with the second area scan camera 9*b* and an additional area scan camera 22. In general, two additional area scan cameras 22 could also be used.

Figure 9A:
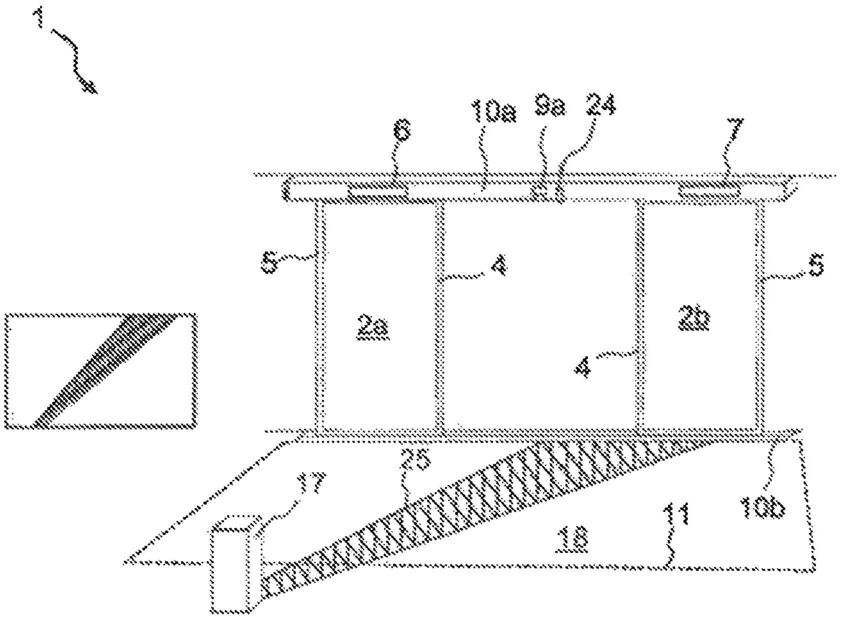
FIGS. 9A, 9B, 10A, 10B show an exemplary embodiment of a sliding door system in which the at least one additional piece of information is provided by a separate illumination source in the form of a flash light or a pulsed light source.
Figure 9B:
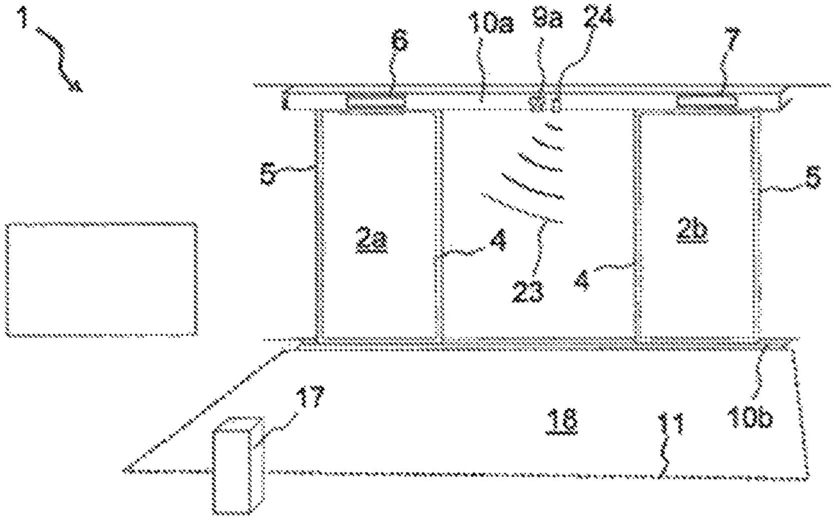

FIGS. 9A, 9B show another exemplary embodiment of the automatic door system 1. The at least one additional piece of information 12 is an illumination light 23 which brightens the first image data from the first area scan camera 9*a*. In this case, the information-generating device 13 comprises an illumination source 24. This illumination source is designed to generate the illumination light 23 only for a period of time and to radiate it into the detection area 11 of the first area scan camera 9*a*, which corresponds approximately to the period of time for the detailed analysis. The illumination source 24 is preferably also arranged on the upper profile assembly 10*a*.

The control device 7 is designed to compare the first image data, which are brightened by the illumination light 23, with reference image data in order to control the drive apparatus 6 as a function of the result in such a way that it moves the at least one door leaf 2*a*, 2*b* in a collision-free manner or does not move it, or stops it.

In FIG. 9A, the object 17 is not in the detection area 11. However—due to the position of the sun, for example—the object 17 casts a shadow 25 that falls into the detection area 11 of the first area scan camera 9*a*. If only the first image data from the first area scan camera 9*a* were evaluated, the control device 7 would tend to have an object 17 in the detection area 11 due to the shadow cast. The control device 7 would then open one or both door leaves 2*a*, 2*b* or cancel a closing process and, if necessary, initiate an opening process.

In FIG. 9B, the result obtained in FIG. 9A as part of the rough analysis is checked. This check is carried out as part of the detailed analysis. In this case, the detection area 11 of the first area scan camera 9*a* is brightened. Due to the additional illumination with the illumination light 23, the shadow cast is no longer present, or it is reduced to such an extent that the control device 7, when comparing the first image data now obtained from the first area scan camera 9*a* with reference image data, comes to the conclusion that there is no object 17 in the detection area 11 or in the area to be secured 16 (not shown).

Figure 10A:
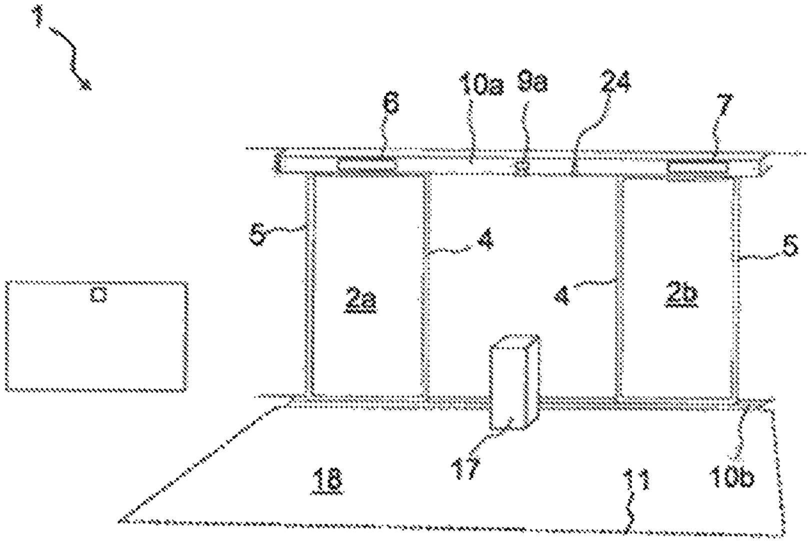
Figure 10B:
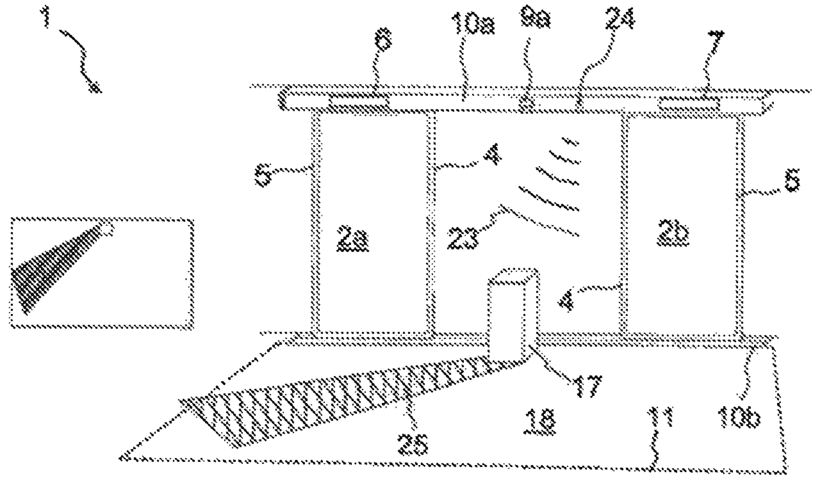

Another scenario is illustrated in FIGS. 10A, 10B. In this case, an object 17 is located directly in front of the main closing edge 4 of the respective door leaves 2*a*, 2*b*. As a result of direct sunlight, for example, the object 17 is not discovered when evaluated only as part of the rough analysis of the first image data captured by the first area scan camera 9*a*. In particular, before initiation of a movement of the first or second door leaf 2*a*, 2*b* or during a movement phase of the first or second door leaf 2*a*, 2*b*, a detailed analysis is carried out and the illumination source 24, which radiates the illumination light 23, is activated. The illumination light 23 casts a shadow on the object 17, which is located in the area to be secured 16, for example. This shadow is detected during evaluation of the first image data, which contain the at least one additional piece of information 12 in the form of brightening by the illumination light 23. The control device 7 then controls the first and/or second door leaf 2*a*, 2*b* in such a way that there is no collision with the object 17.

The illumination light 23 has a wavelength that is preferably in the IR range. The illumination source 24 is preferably a flash light, in which case the illumination source 24 is also preferably designed to activate the illumination light 23 for only less than 1000 ms, 700 ms, 500 ms, 300 ms, or less than 100 ms. The illumination source 24 is also preferably designed to activate the illumination light 23 synchronously with the image capture of the first image data of the first area scan camera 9*a*. The illumination source 24 can also be a pulsed light source. The pulsed light source is activated particularly when the area to be secured 16 or a portion of the area to be secured 16 is to be examined in greater detail. Those of the first image data (e.g., images) in which light from the pulsed light source is present are then used for the detailed analysis. The light pulse has a duration that is preferably shorter than the period of time in which the light is captured on the photosensor or the photosensor of the first area scan camera 9*a*. It may well be that a plurality of images have to be captured, with only that image being selected in order to determine whether an object is in the area to be secured or not on whose capture the product of the additional illumination source is visible by means of light pulses.

Additional information can be used in the event that the ground is wet and causes additional reflection.

The detailed analysis can preferably only be carried out over certain pixels of the first image data from the first area scan camera 9*a*. These specific pixels then define the area to be secured 16. This can also save computing power.

Figure 11A:
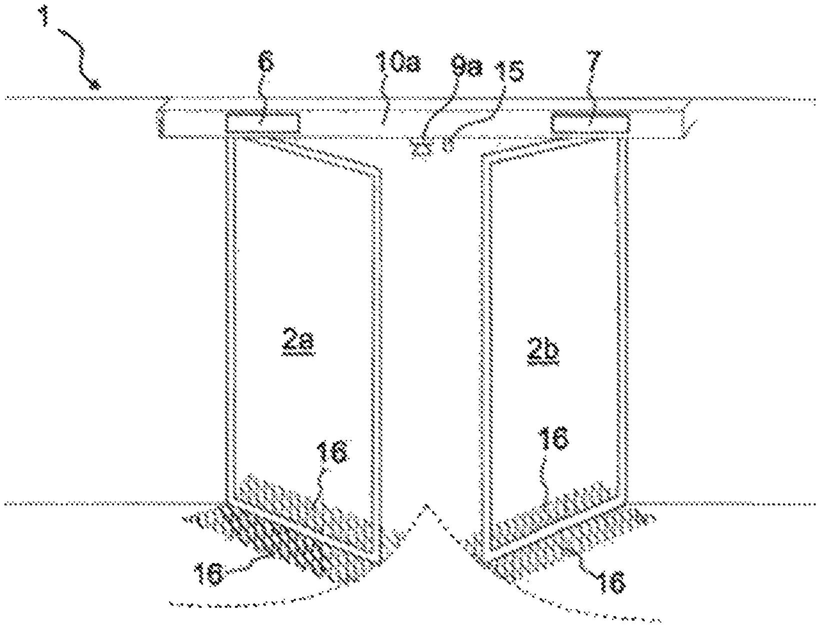
FIGS. 11A, 11B, 11C show different types of automatic door system in the form of a swing door, folding door, or revolving door.
Figure 11B:
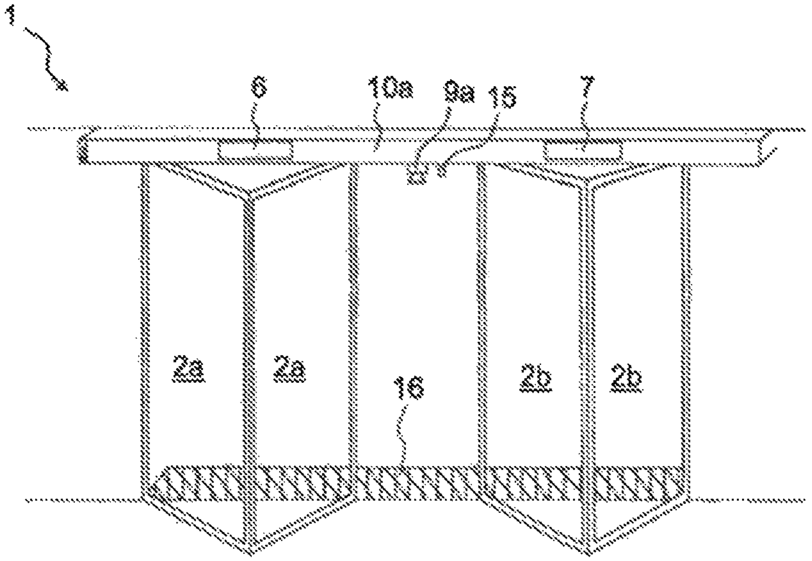
Figure 11C:
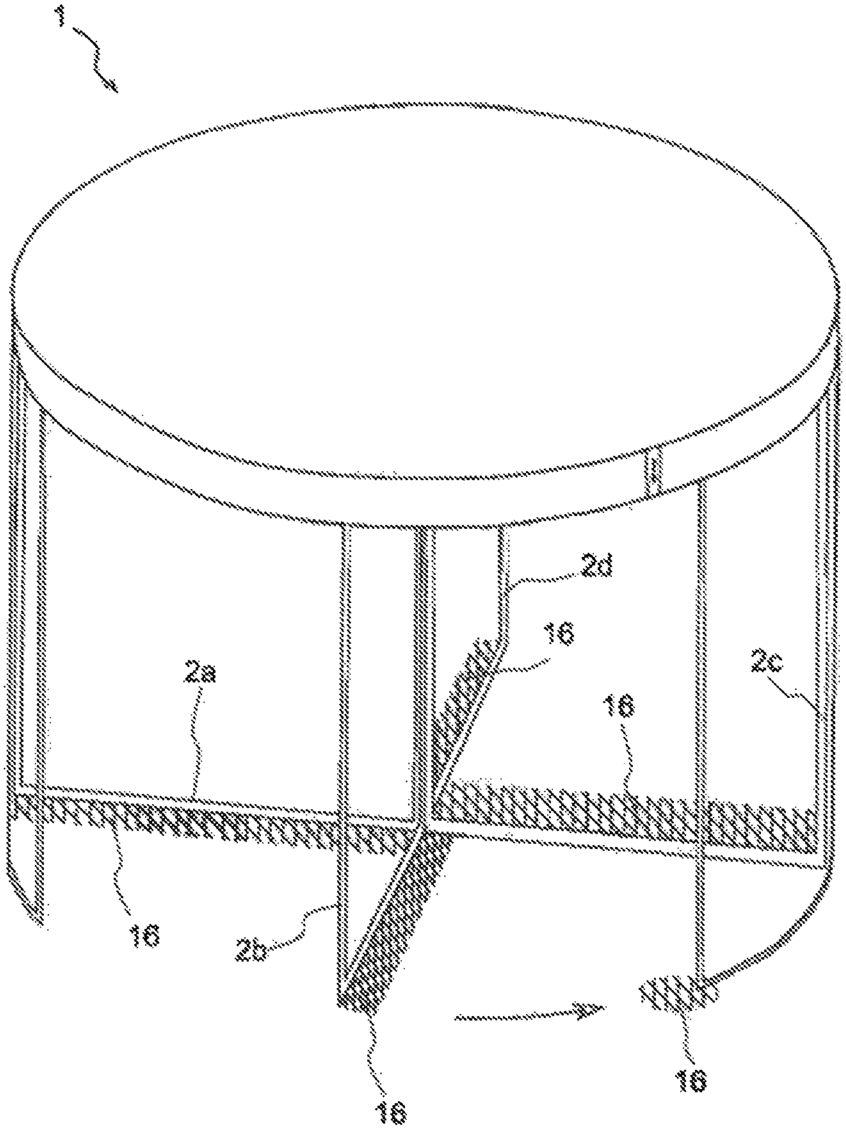

FIGS. 11A, 11B and 11C show other embodiments of the automatic door system 1. FIG. 11A shows a revolving door assembly which comprises two door leaves 2*a*, 2*b* which are moved through a rotary motion. The area to be secured 16 is located in front of the door leaf 2*a*, 2*b* in the direction of movement of the door leaf 2*a*, 2*b*. The information-generating device 13, like the first area scan camera 9*a*, can be arranged stationarily (for example on the upper profile assembly 1*üa*). However, the information-generating device 13, like the first area scan camera 9*a*, can be arranged so as to move along on the corresponding door leaf 2*a*, 2*b*. A plurality of area scan cameras can also be used, with one area scan camera capture areas in the opening direction in front of the door leaf 2*a*, 2*b* and an additional area scan camera capture areas in the closing direction in front of the door leaf 2*a*, 2*b*. The same can also apply to the information-generating device 13 in the form of the projector 15, for example. Here, too, there can be two projectors. It is irrelevant if the structured light pattern 14 strikes the door leaf 2*a*, 2*b*, for example, because this issue can be resolved by a corresponding reference pattern. The portions of the structured light pattern 14 that strike the corresponding door leaf 2*a*, 2*b* can be omitted when evaluating whether an object 17 is in the range of motion of the door leaf 2*a*, 2*b*.

FIG. 11B shows a folding door assembly showing first and second folding door leaves 2*a*, 2*b*. Preferably, the area to be secured 16 extends only on one side of the folding door assembly. The area to be secured extends on the side where there is a risk of entrapment, i.e., where the opening between two segments of a folding door is closed during an opening movement. In this case, it may be sufficient to use exactly one first area scan camera 9*a* and one information-generating device 13 (for example with a projector 15, a second area scan camera 9*b*, and/or an illumination source 24).

FIG. 11C shows a revolving door assembly. This comprises a first, second, third, and fourth door leaf 2*a*, 2*b*, 2*c*, 2*d* which rotate about an axis of rotation. The area to be secured 16 extends in the direction of movement in front of the respective door leaf 2*a*, 2*b*, 2*c*, 2*d* and in front of the respective fixed secondary closing edge 5. The first area scan camera 9*a* can be mounted in the area of the ceiling assembly. The same also applies to the information-generating device 13 (for example with a projector 15, a second area scan camera 9*b*, and/or an illumination source 24). Even when a revolving door is used, it is not a problem if a projector 15 projects the structured light pattern 14 partially onto the corresponding door leaf 2*a*, 2*b*, 2*c*, 2*d*. A corresponding reference pattern can be used to identify which parts of the structured light pattern 14 are striking the object 17. These parts can then be left out when determining whether an object 17 is located in the area to be secured 16.

Figure 12:
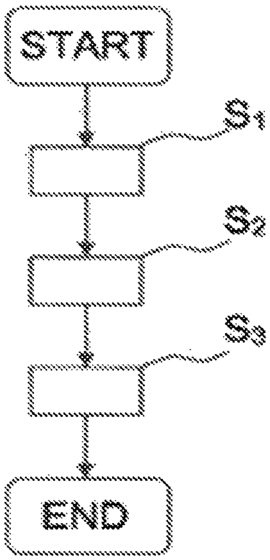
FIG. 12 shows a method for operating the automatic door system.

FIG. 12 shows another method for operating the automatic door system 1. In a first method step S, first image data are transmitted from a first area scan camera 9*a*, which covers a detection area 11, together with the at least one additional piece of information 12 to the control device 7. In a second method step Sa, the control device 7 determines whether an object 17 is located in the area to be secured 16 and whether the door leaf 2*a*, 2*b* can be moved safely or not. In a third method step Sa, the door leaf 2*a*, 2*b* is moved if no danger is posed by an object 17.

The first image data are preferably an image which comprises a certain number of pixels in the horizontal direction and a certain number of pixels in the vertical direction.

The use of the third area scan camera 20 does not inevitably necessitate the use of the second area scan camera 9*b*. The detection areas 11 of the first and third area scan cameras 9*a*, 20 preferably do not overlap, whereas the detection area 11 of the second area scan camera 9*b* usually or always overlaps with another detection area 11 of the first or third area scan cameras 9*a*, 20.

A sliding door assembly can be designed such that the first area scan camera 9*a* predominantly or completely monitors the first side 18, whereas the third area scan camera 20 predominantly or completely monitors the second side 19. The second area scan camera 9*b* can also monitor the first side 18, whereas the detection area 11 of the second area scan camera 9*b* overlaps partially or completely with the detection area 11 of the first area scan camera 9*a*. A projector 15 can also be provide which radiates a structured light pattern 14 both into the detection area 11 of the first and/or second area scan camera 9*a*, 9*b* and into the detection area 11 of the third area scan camera 20. This means that two different pieces of additional information 12 are available to determine an object 17 on the first side 18, whereas only one piece of additional information 12 is available to determine an object 17 on the second side 19.

In principle, two projectors 15, 21 can also be used, with each projector 15, 21 radiating the structured light pattern 14 onto one side 18, 19. The illumination source 24 can also be used instead of the projector 15 or projectors 15, 21 or in addition to the projector 15 or projectors 15, 21. In principle, an additional area scan camera 22 can also be arranged in such a way that the detection area 11 of the additional area scan camera 22 overlaps partially or completely with the detection area 11 of the third area scan camera 20. The aforementioned structure can be used to monitor the main closing edge 4 and/or to monitor the secondary closing edge 5. If the structure is used to monitor the main closing edge 4, the same structure can also be used to monitor the secondary closing edge 5. In principle, the first side 18 can be monitored with one, two, or three additional pieces of information 12. In addition or as an alternative, the second side 19 can be monitored with one, two, or three additional pieces of information 12. In addition or as an alternative, the secondary closing edge 5 can be monitored with one, two, or three additional pieces of information 12—particularly if the secondary closing edge 5 is not monitored with the same sensor device 8 with which the main closing edge 4 is monitored.

The first and second area scan cameras 9*a*, 9*b* are preferably arranged greater than 20 cm, 30 cm, 40 cm, 50 cm, 70 cm, 90 cm, 110 cm, 130 cm, or greater than 150 cm apart from each other. The same can also apply to the first area scan camera 9*a* and the third area scan camera 20 or to the second area scan camera 9*b* and the third area scan camera 20.

The first, second and/or third area scan cameras 9*a*, 9*b*, 20 can have a fisheye lens.

The sensor device 8 is preferably free of photodiodes. The additional information comes only from the image data of the first area scan camera 9*a* (e.g., if this has the structured light pattern 14 and/or the illuminated light 23) or from the image data of the second area scan camera 9*b*. An additional IR photosensor is not used. This makes it possible to further reduce costs.

In particular, the only receivers in the sensor device 8 are area scan cameras 9*a*, 9*b*, 20.

The invention is not limited to the exemplary embodiments that are described. Within the scope of the invention, all of the features described and/or drawn can be combined with one another in any desired manner.

The invention claimed is:

1. An automatic door system with a sensor device for use in buildings, with the following features:

the automatic door system comprises at least one door leaf;

a drive apparatus is provided for moving the at least one door leaf;

a control device is provided and designed to control the drive apparatus in such a way that it moves the at least one door leaf;

characterized by the following features:

the sensor device comprises a first area scan camera which comprises an image sensor, the first area scan camera being designed to generate first image data from a detection area within which the automatic door system can be monitored, wherein an area to be secured is a portion of the detection area;

the control device is designed to determine whether the at least one door leaf can be moved safely based on a rough analysis of the detection area based only on the first image data and a detailed analysis of the area to be secured based on at least a portion of the first image data from the first area scan camera and at least one additional piece of information;

the sensor device comprises an information-generating device which is separate from the first area scan camera and contributes to the generation of the at least one additional piece of information wherein the detailed analysis provides a greater level of accuracy than the rough analysis, wherein the control device is designed to carry out the rough analysis and the detailed analysis a) at the same time, wherein the control device is designed to examine the area to be secured or a portion of the area to be secured for an object only in the detailed analysis; or b) at different times, wherein the control device is designed:

a) to use the same first image data from the first area scan camera for the rough analysis and the detailed analysis; and/or b) to use the most current first image data from the first area scan camera for the rough analysis and the detailed analysis.

2. The automatic door system as set forth in claim 1, characterized by the following features:

the control device is designed to carry out the rough analysis of the first image data from the first area scan camera at regular time intervals;

the control device is also designed to carry out the detailed analysis in the event that the rough analysis of the first image data from the first area scan camera indicates that an object is located in the area to be secured with a probability that is greater than a first threshold value and is preferably less than a second threshold value.

3. The automatic door system as set forth in claim 1, characterized by the following feature:

the control device is designed to control the drive apparatus as a function of the detection of an object in the area to be secured in such a way that the door leaf is moved in such a way that a minimum distance from the object is maintained.

4. The automatic door system as set forth in claim 1, characterized by the following features:

in the case of sliding doors, the area to be secured extends on both sides of the sliding door approximately following a travel path of the door leaf; and/or in the case of swing doors, the area to be secured extends in front of the respective swing door in the direction of movement; and/or in the case of revolving doors, the area to be secured extends in the direction of movement in front of the respective door leaf and in front of the respective fixed secondary closing edge; and/or in the case of folding doors, the area to be secured extends on at least one side of the folding door.

5. The automatic door system as set forth in a claim 1, characterized by the following features: the control device is designed to carry out the detailed analysis a) before the door leaf is moved; and/or b) while the door leaf is moving.

6. The automatic door system as set forth in claim 1, characterized by the following feature:

the first area scan camera is designed to only capture 2D images.

7. A building with an automatic door system which is constructed as set forth in claim 1, characterized by the following features:

the building comprises walls, with a passageway being provided in the walls;

the automatic door system is installed in this passage.

8. A method for operating an automatic door system which is constructed as set forth in claim 1, characterized by the following method steps:

transmitting first image data from the first area scan camera, which covers the detection area, together with the at least one additional piece of information to the control device;

determining whether the door leaf can be moved safely;

moving the door leaf if no danger is posed by an object.

9. An automatic door system with a sensor device for use in buildings, with the following features:

the automatic door system comprises at least one door leaf;

a drive apparatus is provided for moving the at least one door leaf;

a control device is provided and designed to control the drive apparatus in such a way that it moves the at least one door leaf;

wherein:

the sensor device comprises a first area scan camera which comprises an image sensor, the first area scan camera being designed to generate first image data from a detection area within which the automatic door system can be monitored;

the control device is designed to determine whether the at least one door leaf can be moved safely based on a detailed analysis of at least a portion of the first image data from the first area scan camera and at least one additional piece of information;

the sensor device comprises an information-generating device which is separate from the first area scan camera and contributes to the generation of the at least one additional piece of information wherein:

the at least one additional piece of information is a) a structured light pattern which is contained in the first image data of the first area scan camera, the information-generating device comprising a projector which is designed to generate the structured light pattern and radiate it into the detection area of the first area scan camera; and/or b) an illumination light which brightens the first image data of the first area scan camera, in which case the information-generating device is embodied in the form of an illumination source for generating the illumination light only for a period of time and radiating it into the detection area of the first area scan camera, with the period of time corresponding approximately to the period of time of the detailed analysis.

10. The automatic door system as set forth in claim 9, characterized by the following features:

the control device is designed:

a) to compare the structured light pattern in the first image data of the first area scan camera with a reference pattern in order to control the drive apparatus as a function of the result in such a way that it moves the at least one door leaf in a collision-free manner or does not move it, or stops it; and/or b) to compare the first image data that are brightened by the illumination light with reference image data in order to control the drive apparatus as a function of the result in such a way that it moves the at least one door leaf in a collision-free manner or does not move it, or stops it.

11. The automatic door system as set forth in claim 9, characterized by the following feature:

the control device is designed to carry out the detailed analysis with two or three different additional pieces of information.

12. The automatic door system as set forth in claim 9, characterized by the following features:

the structured light pattern has a wavelength in the IR range, the structured light pattern being formed by patterns with a different brightness distribution; and/or the illumination light has a wavelength in the IR range.

13. The automatic door system as set forth in claim 9, characterized by the following features:

the structured light pattern consists of or comprises:

a) lines; and/or b) dashed lines; and/or c) grids; and/or d) dots; and/or e) waves.

14. The automatic door system as set forth in claim 9, characterized by the following feature:

distances between adjacent structures of the structured light pattern are approximately the same or vary by less than 10%, 15%, 20%, 25%, or less than 30%.

15. The automatic door system as set forth in claim 9, characterized by the following features:

a distance between two structures of the structured light pattern is:

a) less than 10 cm, 8 cm, 6 cm, or less than 4 cm; and/or b) greater than 1 cm, 2 cm, 3 cm, 5 cm, 7 cm, or greater than 9 cm.

16. The automatic door system as set forth in claim 9, characterized by the following features:

a thickness of a structure of the structured light pattern is:

a) less than 8 mm, 6 mm, 4 mm, or less than 3 mm; and/or b) greater than 0.5 mm, 1 mm, 2 mm, or greater than 3 mm.

17. The automatic door system as set forth in claim 9, characterized by the following features:

the automatic door system is an automatic sliding door;

the first area scan camera is arranged on a first side of the automatic sliding door, the detection area of the first area scan camera lying predominantly or completely on the first side of the automatic sliding door;

the sensor device comprises a third area scan camera which comprises an image sensor, the third area scan camera generating third image data from a detection area which monitors areas of the automatic door system;

the third area scan camera is arranged on a second side of the automatic sliding door, the detection area of the third area scan camera lying predominantly or completely on the second side of the automatic sliding door;

the projector of the information-generating device is arranged in a passage area and is designed to generate the structured light pattern and radiate it into the detection area of the first and third area scan cameras; or the information-generating device comprises an additional projector which is designed to generate a structured light pattern and to radiate it into the detection area of the third area scan camera;

the control device is designed to compare the structured light pattern in the first image data of the first area scan camera and in the third image data of the third area scan camera with a respective reference pattern in order, as a function of the result, to control the drive apparatus in such a way that it moves the at least one door leaf in a collision-free manner or does not move it, or stops it.

18. The automatic door system as set forth in claim 9, characterized by the following features:

the automatic door system is an automatic sliding door;

the control device is designed to monitor a main closing edge of the automatic sliding door with the first area scan camera and the projector during the detailed analysis and to monitor a secondary closing edge of the automatic sliding door with:

a) the first area scan camera and the projector; or b) an additional area scan camera and the projector; or c) the first area scan camera and an additional projector; or d) an additional area scan camera and an additional projector.

19. The automatic door system as set forth in claim 9, characterized by the following features:

the second area scan camera differs from the first area scan camera in terms of a) the type of image sensor; and/or b) the resolution; and/or c) the size of the detection area; and/or d) the type of optics; and/or e) orientation.

20. The automatic door system as set forth in claim 9, characterized by the following features:

the automatic door system is an automatic sliding door;

the first area scan camera is arranged on a first side of the automatic sliding door, and a second area scan camera is arranged on a second side of the automatic sliding door;

the first and second area scan cameras are arranged at a passage area of the automatic sliding door in such a way that:

a) a portion of the detection area of the second area scan camera extends to the first side of the automatic sliding door when the sliding door is at least partially open and overlaps with the detection area of the first area scan camera, the control device being designed to calculate the first and second image data in the area of overlap on the first side of the automatic sliding door in the detailed analysis in order to increase the resolution or generate spatial information in order, as a function of the result, to control the drive apparatus in such a way that it moves the at least one door leaf in a collision-free manner or does not move it, or stops it; and/or b) a portion of the detection area of the first area scan camera extends to the second side of the automatic sliding door when the sliding door is at least partially open and overlaps with the detection area of the second area scan camera, the control device being designed to calculate the first and second image data in the area of overlap on the second side of the automatic sliding door in the detailed analysis in order to increase the resolution or generate spatial information in order, as a function of the result, to control the drive apparatus in such a way that it moves the at least one door leaf in a collision-free manner or does not move it, or stops it.

21. The automatic door system as set forth in claim 9, characterized by the following features:

the automatic door system is an automatic sliding door;

the control device is designed to monitor a main closing edge of the automatic sliding door with the first area scan camera and a second area scan camera in the detailed analysis and to monitor a secondary closing edge of the automatic sliding door with:

a) the first area scan camera and the second area scan camera; or b) an additional area scan camera and a second area scan camera; or c) the first area scan camera and an additional area scan camera; or d) two additional area scan cameras.

22. The automatic door system as set forth in claim 9, characterized by the following features:

the illumination source is a flash light, the flash light being triggered synchronously with the image capture performed by the first area scan camera; and/or the illumination source is a pulsed light source, in which case only those first image data are used in which the light from the pulsed light source has, as additional information, a light intensity that is greater than a threshold value.

* * * * *